(12) United States Patent
Fells et al.

(10) Patent No.: US 8,587,154 B2
(45) Date of Patent: Nov. 19, 2013

(54) INDUCTIVE POWER SUPPLY

(75) Inventors: Julian Andrew John Fells, Horsham (GB); David Martin Pooley, Stapleford (GB)

(73) Assignee: Access Business Group International LLC, Ada, MI (US)

(*) Notice: Subject to any disclaimer, the term of this patent is extended or adjusted under 35 U.S.C. 154(b) by 135 days.

(21) Appl. No.: 12/672,691

(22) PCT Filed: Aug. 28, 2008

(86) PCT No.: PCT/GB2008/002906
§ 371 (c)(1),
(2), (4) Date: Feb. 9, 2010

(87) PCT Pub. No.: WO2009/027674
PCT Pub. Date: Mar. 5, 2009

(65) Prior Publication Data
US 2012/0007437 A1    Jan. 12, 2012

(30) Foreign Application Priority Data

Aug. 28, 2007 (GB) .................................. 0716679.6

(51) Int. Cl.
  *H01F 27/42* (2006.01)
(52) U.S. Cl.
  USPC ........................................................ 307/104
(58) Field of Classification Search
  USPC ........................................................ 307/104
  See application file for complete search history.

(56) References Cited

U.S. PATENT DOCUMENTS 4,873,677 A * 10/1989 Sakamoto et al. ............ 368/204
5,311,973 A *  5/1994 Tseng et al. .................... 191/10

(Continued)

FOREIGN PATENT DOCUMENTS

| EP | 0298707 | 1/1989 |
| EP | 0298707 | 11/1989 |

(Continued)

OTHER PUBLICATIONS

Hatanaka, Sato, Matsuki, Kikuchi, Murakami, Kawase, and Satoh, Power Transmission of a Desk With a Cord-Free Power Supply, IEEE Transactions on Magnetics, vol. 38, No. 5, pp. 3329-3331, Sep. 2002.

(Continued)

*Primary Examiner* — Adi Amrany
(74) *Attorney, Agent, or Firm* — Warner Norcross & Judd LLP

(57) ABSTRACT

There is disclosed an inductive power transfer system including a primary unit and a secondary device separable from the primary unit, the primary unit may include a power transfer surface and more than two field generators each operable to generate an electromagnetic field. The field generators may be located at different positions relative to the power transfer surface. The secondary device may include a power receiver having a secondary coil. In one embodiment, the system may determine at least one of the position and the orientation of the power receiver relative to the power transfer surface, and control the field generators such that at least one first field generator and at least one second field generators, selected in dependence upon such determination, are active in a substantially opposite sense to one another so as to direct magnetic flux through the secondary coil thereby supplying power to the secondary device, and further such that a third one of the field generators is inactive so that fewer than all of the field generators are active simultaneously.

29 Claims, 27 Drawing Sheets

(56) References Cited

U.S. PATENT DOCUMENTS

| | | | |
|---|---|---|---|
| 5,396,538 A * | 3/1995 | Hong | 455/573 |
| 5,519,262 A | 5/1996 | Wood | |
| 5,600,225 A * | 2/1997 | Goto | 320/108 |
| 5,734,254 A * | 3/1998 | Stephens | 320/106 |
| 5,821,728 A * | 10/1998 | Schwind | 320/108 |
| 5,923,544 A * | 7/1999 | Urano | 363/22 |
| 6,212,430 B1 | 4/2001 | Kung | |
| 6,366,817 B1 | 4/2002 | Kung | |
| 6,400,991 B1 | 6/2002 | Kung | |
| 6,442,434 B1 | 8/2002 | Zarinetchi et al. | |
| 6,459,218 B2 | 10/2002 | Boys et al. | |
| 6,621,183 B1 | 9/2003 | Boys | |
| 6,650,213 B1 * | 11/2003 | Sakurai et al. | 335/296 |
| 6,756,697 B2 | 6/2004 | Mizutani et al. | |
| 6,803,744 B1 | 10/2004 | Sabo | |
| 7,062,331 B2 | 6/2006 | Zarinetchi et al. | |
| 7,076,206 B2 | 7/2006 | Elferich et al. | |
| 7,155,291 B2 | 12/2006 | Zarinetchi et al. | |
| 7,164,255 B2 * | 1/2007 | Hui | 320/108 |
| 7,211,986 B1 * | 5/2007 | Flowerdew | 320/108 |
| 7,212,414 B2 * | 5/2007 | Baarman | 363/16 |
| 7,233,137 B2 * | 6/2007 | Nakamura et al. | 323/355 |
| 7,262,700 B2 * | 8/2007 | Hsu | 340/572.1 |
| 7,450,910 B2 * | 11/2008 | Aoki | 455/69 |
| 7,521,890 B2 * | 4/2009 | Lee et al. | 320/108 |
| 7,522,878 B2 * | 4/2009 | Baarman | 455/41.1 |
| 7,576,514 B2 * | 8/2009 | Hui | 320/108 |
| 7,622,891 B2 * | 11/2009 | Cheng et al. | 320/108 |
| 7,639,514 B2 * | 12/2009 | Baarman | 363/16 |
| 7,872,445 B2 * | 1/2011 | Hui | 320/108 |
| 7,885,050 B2 | 2/2011 | Lee | |
| 7,906,936 B2 * | 3/2011 | Azancot et al. | 320/108 |
| 7,952,324 B2 * | 5/2011 | Cheng et al. | 320/108 |
| 8,049,370 B2 * | 11/2011 | Azancot et al. | 307/104 |
| 8,159,183 B2 * | 4/2012 | Choi et al. | 320/108 |
| 8,338,990 B2 * | 12/2012 | Baarman et al. | 307/104 |
| 2001/0000960 A1 * | 5/2001 | Dettloff | 343/748 |
| 2002/0018025 A1 * | 2/2002 | Matsuda et al. | 343/895 |
| 2003/0048254 A1 | 3/2003 | Huang | |
| 2004/0130916 A1 * | 7/2004 | Baarman | 363/21.02 |
| 2005/0007067 A1 | 1/2005 | Baarman et al. | |
| 2005/0068019 A1 * | 3/2005 | Nakamura et al. | 323/355 |
| 2005/0189910 A1 * | 9/2005 | Hui | 320/108 |
| 2007/0139000 A1 | 6/2007 | Kozuma et al. | |
| 2007/0145830 A1 | 6/2007 | Lee et al. | |
| 2007/0182367 A1 | 8/2007 | Partovi | |
| 2008/0067874 A1 * | 3/2008 | Tseng | 307/104 |
| 2008/0265684 A1 * | 10/2008 | Farkas | 307/104 |
| 2009/0033280 A1 | 2/2009 | Choi et al. | |
| 2009/0102419 A1 * | 4/2009 | Gwon et al. | 320/108 |
| 2011/0025133 A1 * | 2/2011 | Sauerlaender et al. | 307/104 |

FOREIGN PATENT DOCUMENTS

| | | |
|---|---|---|
| GB | 2117579 | 10/1983 |
| GB | 2388716 | 11/2003 |
| JP | 2005-160253 | 6/2005 |
| WO | 03105308 | 12/2003 |
| WO | 2008137884 | 11/2008 |
| WO | 2008137996 | 11/2008 |

OTHER PUBLICATIONS

International Search Report, International Application No. PCT/GB2008/002906, International Filing Date Aug. 28, 2008.

Written Opinion, International Application No. PCT/GB2008/002906, International Filing Date Aug. 28, 2008.

K. Hatanaka, F. Sato, H. Matsuki, S. Kikuchi, J. Murakami, M. Kawase, and T. Satoh, Excited Composition of Primary Side in a Position-Free Contactless Power Station System, vol. 26, No. 4, 2002, pp. 580-584.

K. Hatanaka, F. Sato, H. Matsuki, S. Kikuchi, J. Murakami, M. Kawase, and T. Satoh, Coil Shape in a Desk-Type Contactless Power Station System, vol. 25, No. 4-2, 2001, pp. 1015-1018.

F. Sato, J. Murakami, H. Matsuki, S. Kikuchi, K. Harakawa and T. Satoh, Stable Energy Transmission to Moving Loads utilizing new CLPS, IEEE Transactions on Magnetics, vol. 32, No. 5, Sep. 1996.

J. Murakami, F. Sato, T. Watanabe, H. Matsuki, S. Kikuchi, K. Harakawa and T. Satoh, Consideration on Cordless Power Station—Contactless Power Transmission System, IEEE Transactions on Magnetics, vol. 32, No. 5, Sep. 1996, pp. 5037-5039.

F. Sato, J. Murakami, T. Suzuki, H. Matsuki, S. Kikuchi, K. Harakawa, H. Osada, and K. Seki, Contactless Energy Transmission to Mobile Loads by CLPS—Test Driving of an EV with Starter Batteries, 1997 IEEE, vol. 33, No. 5, Sep. 1997, pp. 4203-4205.

* cited by examiner

INDUCTIVE POWER SUPPLY

Mobile phones and other portable electronic devices generally need frequent recharging. To make recharging more convenient a recharging pad has been proposed in which there is a surface upon which devices may be placed in order to receive power wirelessly. This removes the need to physically connect a power cable to the portable device. It may also be designed such that a range of different models and types of device can share the same charger. Further, it may be large enough to accommodate more than one device, so that multiple devices can be recharged simultaneously. However, it is particularly advantageous if it is possible to simply drop the device onto the pad without having regard for the position or orientation of the device on the pad.

There have been several solutions to the problem of providing a recharging surface so that devices may be placed on the pad without having to align the position and/or orientation of the device. The first is the applicant's granted patent GB 2388716. In this system, the pad generates a rotating horizontal field across the surface of the pad. The portable device has a receiver which consists of a magnetic coil with an axis parallel to the pad surface, which couples with the horizontal field from the pad. Another solution to the problem is that of WO 03/105308 A1 published on 18 Dec. 2003. In this system there is an array of coils generating a vertical field. The device has a receiver with a coil which has an axis perpendicular to the pad surface to couple with the field from the pad.

However, both of the above systems achieve freedom of placement of the portable device by generating a uniform field across the full surface of the pad. This has two disadvantages: Firstly, since the whole device is in the magnetic field, the field will couple to metal in the portable device; this sets up Eddy currents which results in losses and consequently power dissipation causing the device to heat up. Secondly, generating a field over the entire surface results in a low coupling between the recharger and the device coils, and high losses. Again any losses present will result in power dissipation and heat generation.

According to a first aspect of the invention there is provided a system for transferring power from a primary unit to a secondary device, separable from the primary unit, by electromagnetic induction the primary unit comprising:

a power transfer surface;

a plurality of field generators, each able to generate a field substantially perpendicular to the power transfer surface;

at least one secondary device comprising:

a power receiver comprising a secondary coil such that when the secondary device is in its working disposition the coil axis is substantially parallel to the power transfer surface;

wherein magnetic flux from at least one field generator flows through the secondary coil, supplying power to the secondary device.

This aspect has the advantage that the secondary device may be placed anywhere on or in proximity to the power transfer surface to receive power, but at the same time the field is localised to the vicinity of the power receiver within the secondary device such that coupling to the rest of the portable device is minimised.

According to a second aspect of the invention there is provided a system for transferring power from a primary unit to a secondary device, separable from the primary unit, by electromagnetic induction the primary unit comprising:

a power transfer surface;

a plurality of field generators, each able to generate a field substantially perpendicular to the power transfer surface;

sensing means for determining the position of a power receiver within a secondary device relative to the power transfer surface;

switching means for activating one or more field generators at least one secondary device comprising:

a power receiver comprising a secondary coil such that when the secondary device is in its working disposition the coil axis is substantially parallel to the power transfer surface;

wherein the sensing means determines the position of the power receiver, and in dependence the switching means acts to activate at least one field generator such that a magnetic flux flows through the secondary coil, supplying power to the secondary device.

This aspect has the advantage that the secondary device may be placed anywhere on or in proximity to the power transfer surface to receive power, but at the same time the field is localised to the vicinity of the power receiver within the secondary device such that coupling to the rest of the portable device is minimised.

According to a third aspect of the invention there is provided a system for transferring power from a primary unit to a secondary device, separable from the primary unit, by electromagnetic induction the primary unit comprising:

a power transfer surface;

a plurality of field generators, each able to generate a field substantially perpendicular to the power transfer surface;

sensing means for determining the position of a power receiver within a secondary device relative to the power transfer surface;

switching means for activating the field generators at least one secondary device comprising:

a power receiver comprising a secondary coil such that when the secondary device is in its working disposition the coil axis is substantially parallel to the power transfer surface;

wherein the sensing means determines the position of the receiver;

wherein the switching means acts to activate a first field generator;

wherein the switching means acts to activate a second field generator such that the field generated is in the opposite sense to the first field generator;

wherein magnetic flux from the first and second field generators flows through the secondary coil, supplying power to the secondary device.

This aspect has the advantage that the secondary device may be placed anywhere on or in proximity to the power transfer surface to receive power, but at the same time the field is localised to the vicinity of the power receiver within the secondary device such that coupling to the rest of the portable device is minimised.

According to a fourth aspect of the invention there is provided a system for transferring power from a primary unit to a secondary device, separable from the primary unit, by electromagnetic induction the primary unit comprising:
a power transfer surface;
a plurality of field generators, each able to generate a field substantially perpendicular to the power transfer surface;
sensing means for determining the position of a power receiver within a secondary device relative to the power transfer surface;
switching means for supplying current from the current generator to the primary coils;
at least one secondary device comprising:
a power receiver comprising a core and a secondary coil wound around the core;
wherein when the secondary device is in its working disposition the coil axis is substantially parallel to the power transfer surface;
wherein the sensing means determines the position of the receiver,
wherein the switching means acts to activate a first field generator in proximity to a first end of the power receiver;
wherein the switching means acts to activate a second field generator in proximity to a second end of the power receiver such that the field generated is in the opposite sense to the first field generator;
wherein magnetic flux from the first and second field generators flows through the secondary coil, supplying power to the secondary device.

This aspect has the advantage that the secondary device may be placed anywhere on or in proximity to the power transfer surface to receive power, but at the same time the field is localised to the vicinity of the power receiver within the secondary device such that coupling to the rest of the portable device is minimised.

According to a fifth aspect of the invention there is provided a system for transferring power from a primary unit to a secondary device, separable from the primary unit, by electromagnetic induction
the primary unit comprising:
a power transfer surface;
a plurality of primary coils, each with an axis substantially perpendicular to the power transfer surface;
a current generator for supplying an alternating current to the primary coils;
at least one secondary device comprising:
a power receiver comprising a secondary coil such that when the secondary device is in its working disposition the coil axis is substantially parallel to the power transfer surface;
wherein the current generator supplies current to at least one primary coil such that a magnetic flux flows through the secondary coil, supplying power to the secondary device.

This aspect has the advantage that the secondary device may be placed anywhere on or in proximity to the power transfer surface to receive power, but at the same time the field is localised to the vicinity of the power receiver within the secondary device such that coupling to the rest of the portable device is minimised.

According to a sixth aspect of the invention there is provided a system for transferring power from a primary unit to a secondary device, separable from the primary unit, by electromagnetic induction
the primary unit comprising:
a power transfer surface;
a plurality of primary coils, each with an axis substantially perpendicular to the power transfer surface;
a current generator for generating an alternating current;
sensing means for determining the position of a power receiver within the secondary device relative to the power transfer surface;
switching means for supplying current from the current generator to the primary coils;
at least one secondary device comprising:
a power receiver comprising a secondary coil such that when the secondary device is in its working disposition the coil axis is substantially parallel to the power transfer surface;
wherein the sensing means determines the position of the receiver, and in dependence the switching means acts to supply current to at least one primary coil such that a magnetic flux flows through the secondary coil, supplying power to the secondary device.

This aspect has the advantage that the secondary device may be placed anywhere on or in proximity to the power transfer surface to receive power, but at the same time the field is localised to the vicinity of the power receiver within the secondary device such that coupling to the rest of the portable device is minimised.

According to a seventh aspect of the invention there is provided a system for transferring power from a primary unit to a secondary device, separable from the primary unit, by electromagnetic induction
the primary unit comprising:
a power transfer surface;
a plurality of primary coils, each with an axis substantially perpendicular to the power transfer surface;
a current generator for generating an alternating current;
sensing means for determining the position of a power receiver within a secondary device relative to the power transfer surface;
switching means for supplying current from the current generator to the primary coils;
the secondary device comprising:
a power receiver comprising a secondary coil such that when the secondary device is in its working disposition the coil axis is substantially parallel to the power transfer surface;
wherein the sensing means determines the position of the receiver, and in dependence the switching means acts to supply current in one sense to at least one primary coil and current in the opposite sense to at least one primary coil, such that a magnetic flux flows through the secondary coil, supplying power to the secondary device.

This aspect has the advantage that the secondary device may be placed anywhere on or in proximity to the power transfer surface to receive power, but at the same time the field is localised to the vicinity of the power receiver within the secondary device such that coupling to the rest of the portable device is minimised.

According to a eighth aspect of the invention there is provided a system for transferring power from a primary unit to a secondary device, separable from the primary unit, by electromagnetic induction
the primary unit comprising:
a power transfer surface;
a plurality of primary coils, each with an axis substantially perpendicular to the power transfer surface;
a current generator for generating an alternating current;
sensing means for determining the position of a power receiver within a secondary device relative to the power transfer surface;
switching means for supplying current from the current generator to the primary coils;

the secondary device comprising:
  a power receiver comprising a core and a secondary coil wound around the core;
  wherein when the secondary device is in its working disposition the coil axis is substantially parallel to the power transfer surface;
  wherein the sensing means determines the position of the receiver,
  wherein the switching means acts to supply current to at least a first primary coil in proximity to a first end of the core;
  wherein the switching means acts to supply current to at least a second primary coil in proximity to a second end of the core, the direction of the current being in the opposite direction to that of the first primary coil.
  wherein magnetic flux flows through the secondary coil, supplying power to the secondary device.

This aspect has the advantage that the secondary device may be placed anywhere on or in proximity to the power transfer surface to receive power, but at the same time the field is localised to the vicinity of the power receiver within the secondary device such that coupling to the rest of the portable device is minimised.

According to a ninth aspect of the invention there is provided a primary unit for transferring power to a secondary device, separable from the primary unit, by electromagnetic induction
  the primary unit comprising:
  a power transfer surface;
  a plurality of field generators, each able to generate a field substantially perpendicular to the power transfer surface;
  sensing means for determining the position of a power receiver within a secondary device relative to the power transfer surface;
  switching means for activating the field generators;
  wherein the sensing means determines the position of the power receiver, and in dependence the switching means activates a field generator such that a magnetic flux flows through the secondary coil in a direction substantially parallel to the power transfer surface, thereby transferring power to the secondary device.

This aspect has the advantage that the secondary device may be placed anywhere on or in proximity to the power transfer surface to receive power, but at the same time the field is localised to the vicinity of the power receiver within the secondary device such that coupling to the rest of the portable device is minimised.

According to a tenth aspect of the invention there is provided a method for transferring power from a primary unit to a secondary device, separable from the primary unit, by electromagnetic induction, the method comprising the steps of:
  providing a power transfer surface;
  providing a plurality of field generators, each able to generate a field substantially perpendicular to the power transfer surface;
  providing at least one secondary device comprising a power receiver;
  sensing the position of the receiver relative to the power transfer surface
  activating at least one field generator such that a magnetic flux flows through the secondary coil in a direction substantially parallel to the power transfer surface thereby supplying power to the secondary device.

This aspect has the advantage that the secondary device may be placed anywhere on or in proximity to the power transfer surface to receive power, but at the same time the field is localised to the vicinity of the power receiver within the secondary device such that coupling to the rest of the portable device is minimised.

BRIEF DESCRIPTION OF THE DRAWINGS

Reference will now be made, by way of example only, to the accompanying figures, of which.

DESCRIPTION OF THE CURRENT EMBODIMENTS

Figure 1:
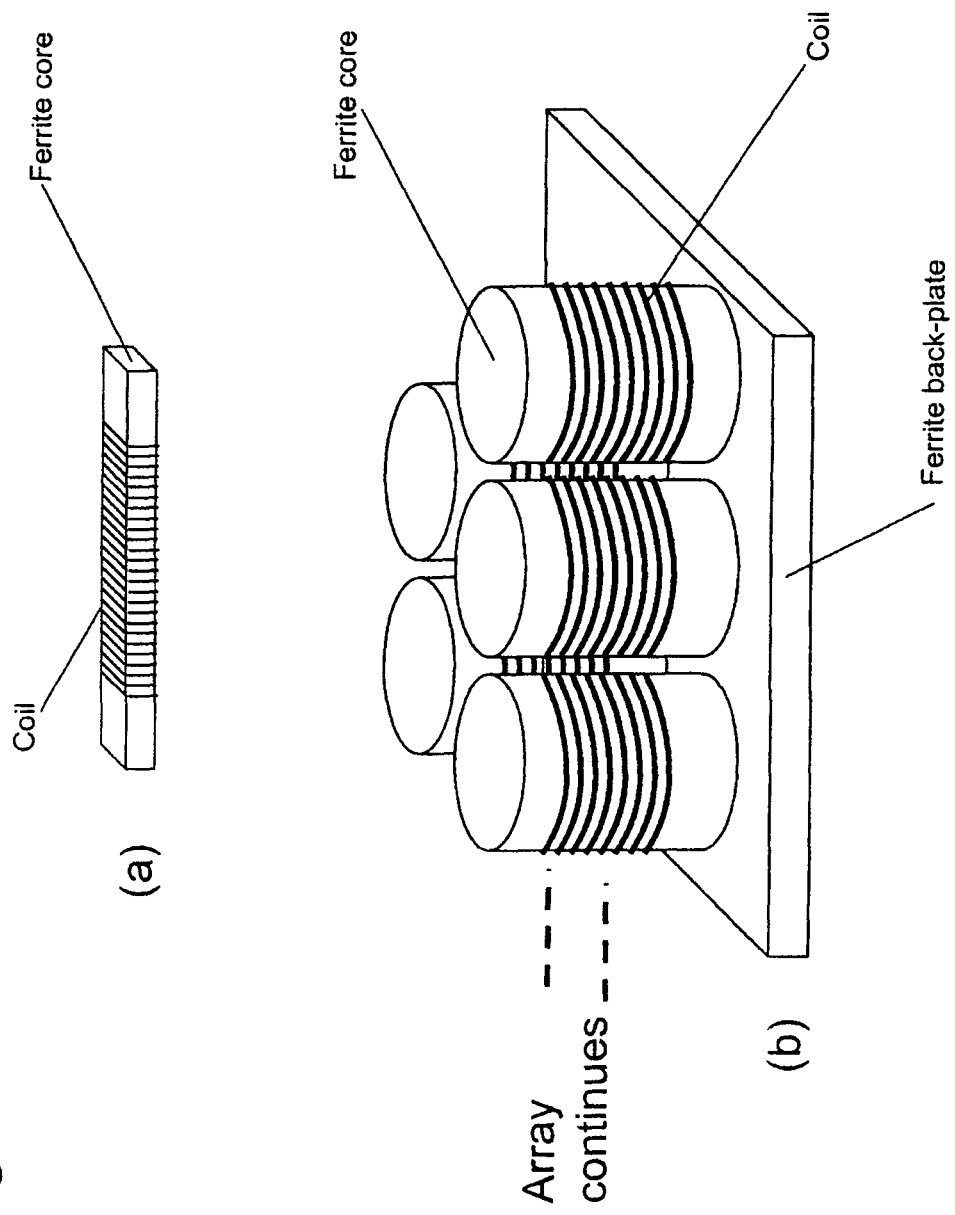
FIG. 1 shows a system for transferring power from a charger to a portable device according to the present invention.

FIG. 1 shows a system for wirelessly charging a portable device. FIG. 1(a) shows a power receiver suitable for embedding in a portable device. It has a ferrite core and coil wound around the core. FIG. 1(b) shows part of a charging pad for transmitting power to the receiver. The pad consists of an array of coils, each wound around a ferrite core. These cores are attached to a ferrite backplate. A charging surface is formed across the ends of the cores, such that the coil axes are perpendicular to the charging surface. This would typically be covered by a plastic housing (not shown). Current is applied to the coils so as to generate a magnetic field in a direction perpendicular to the charging surface. Depending on the polarity of the current, this direction will be either out of or into the charging surface. Preferably Litz wire is used for both the primary and secondary coils. Litz wire has many strands of copper, each insulated from one another. This allows the copper losses to be reduced as at high frequencies the skin effect means that current is only carried in the outer skin of the conductors.

Figure 2:
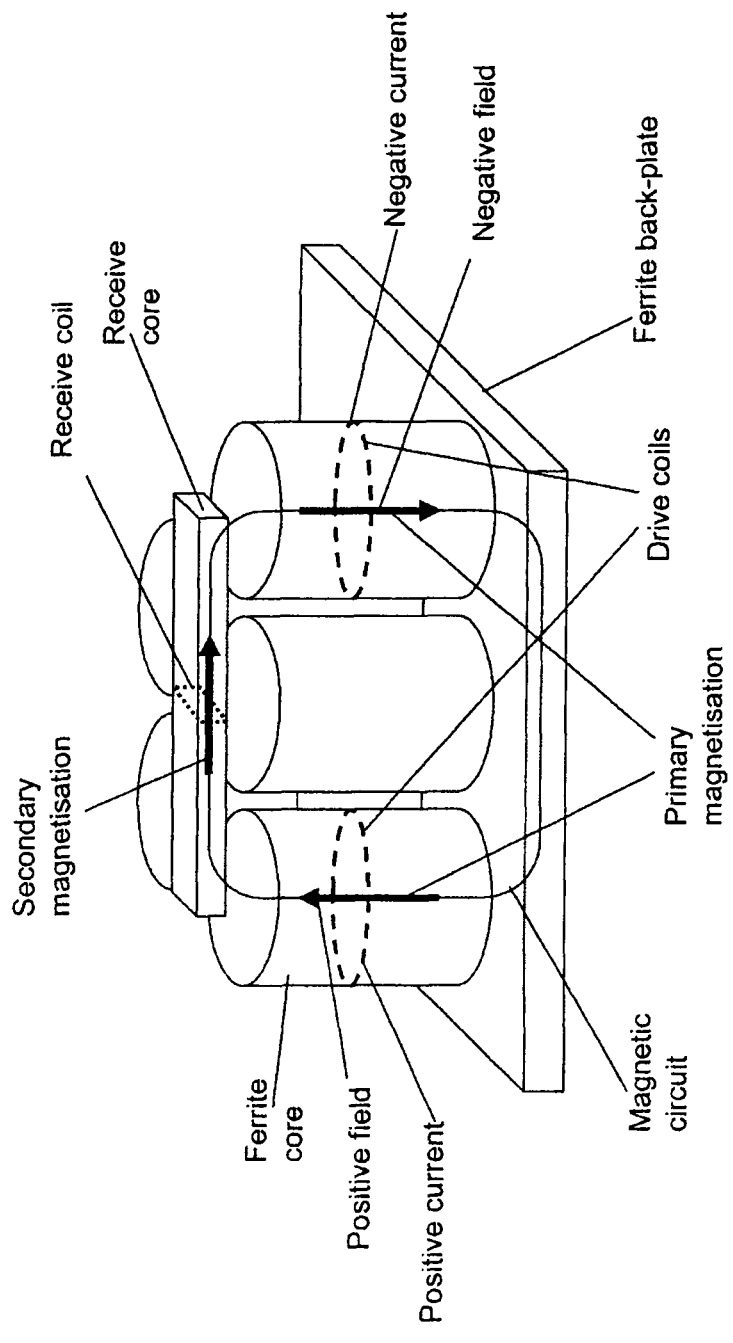
FIG. 2 shows a system for transferring power from a charger to a portable device according to the present invention.

FIG. 2 illustrates the magnetic circuit formed when the power receiver is placed on the charging surface. A coil in proximity to one end of the receiver is driven with current in a positive sense and a coil in proximity to the other end is driven in a negative sense. The field is concentrated in the ferrite and forms a magnetic circuit from the first coil, through the receiver core, through the second coil and through the ferrite backplate to complete the circuit. There are small gaps in the circuit between the charging surface and the power receiver because of the plastic housings on both the charging pad and the portable device. The thickness of the plastic should be minimised to reduce this gap and gaps of 2 mm or less are achievable.

A preferred design arrangement uses coils which are 12.7 mm high, have a diameter of 12.7 mm and are separated on a 15 mm pitch. The receiver is 25 mm long.

Figure 3:
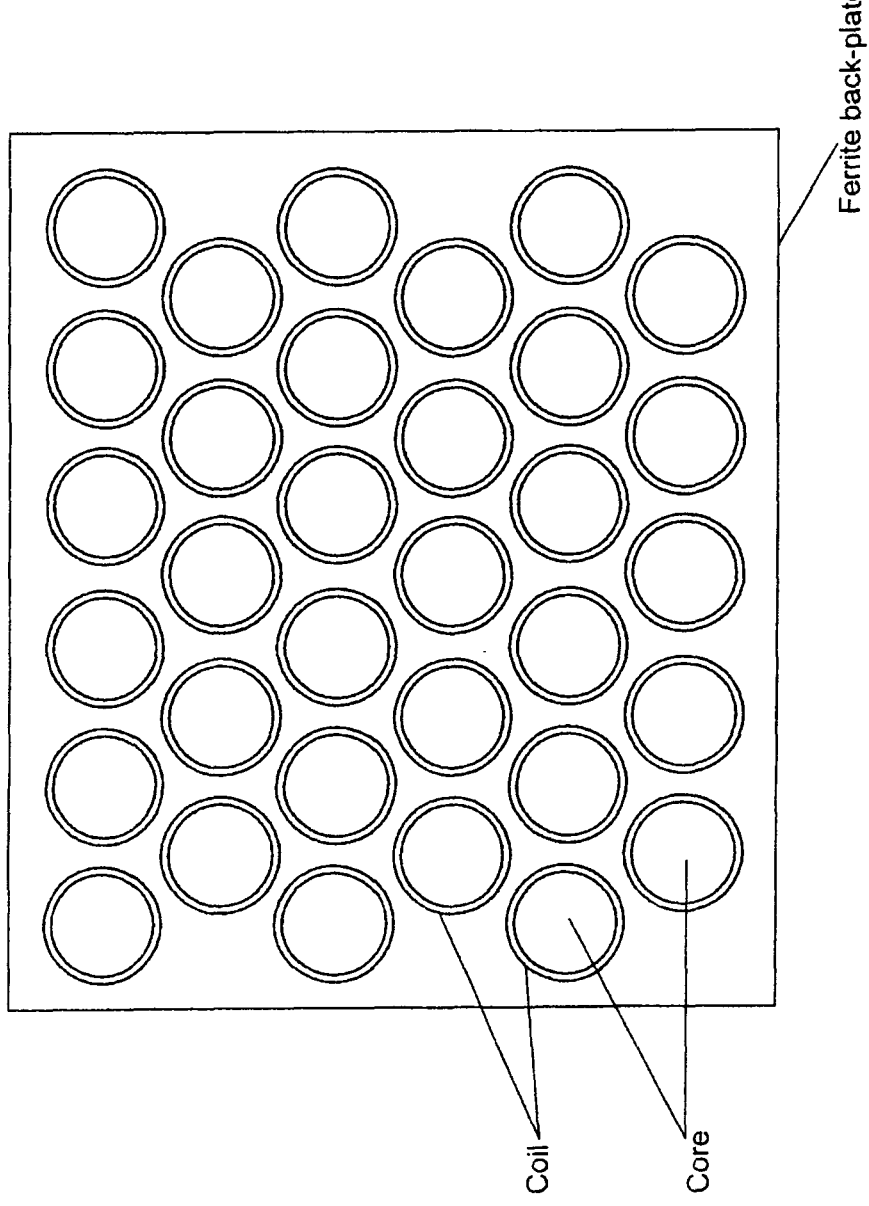
FIG. 3 shows a charger for transferring power according to the present invention.

FIG. 3 shows a view of the top surface of the charging pad. An array of coils and cores are present, arranged with hexagonal symmetry as this gives the best packing to allow appropriate coils to be activated when the receiver is placed on the charging surface in an arbitrary position and orientation.

Figure 4:
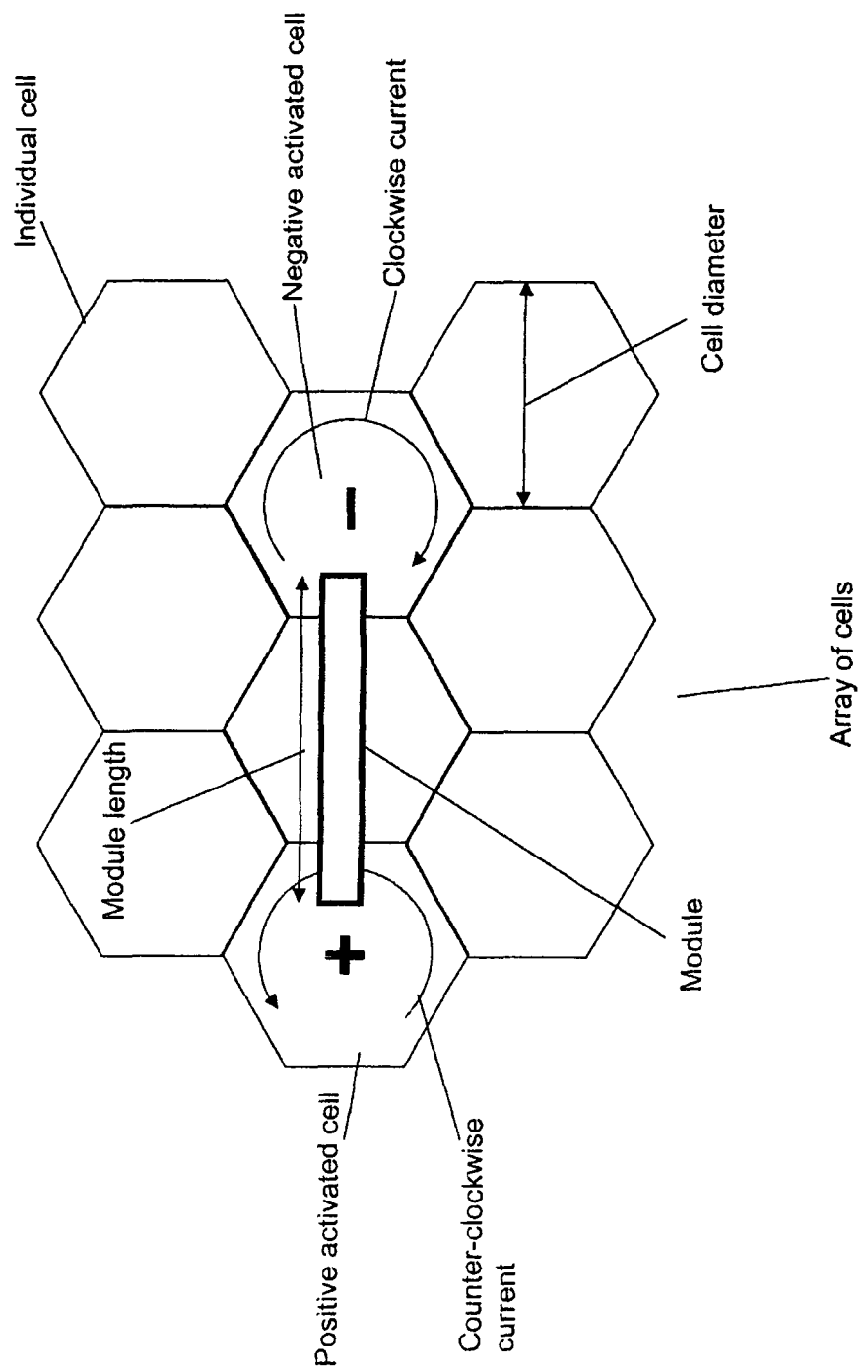
FIG. 4 shows a configuration for transferring power to a power receiver.

FIG. 4 illustrates the dimensional relationship between the power receiver and the charger coils. For clarity, the coil positions are represented by hexagonal cells to reflect the hexagonal symmetry of the structure. The energised coils are represented by a '+' for current flowing in a counter clockwise direction and '−' for current flowing in a clockwise direction. The coils themselves could physically be a range of different structures as will be become apparent later. Dimensions which give good performance for powers of 2-5 W are: a power receiver which is 30 mm long with a cross section of 2 mm×6 mm; and a charging surface with a cell diameter of 15 mm.

Figure 5:
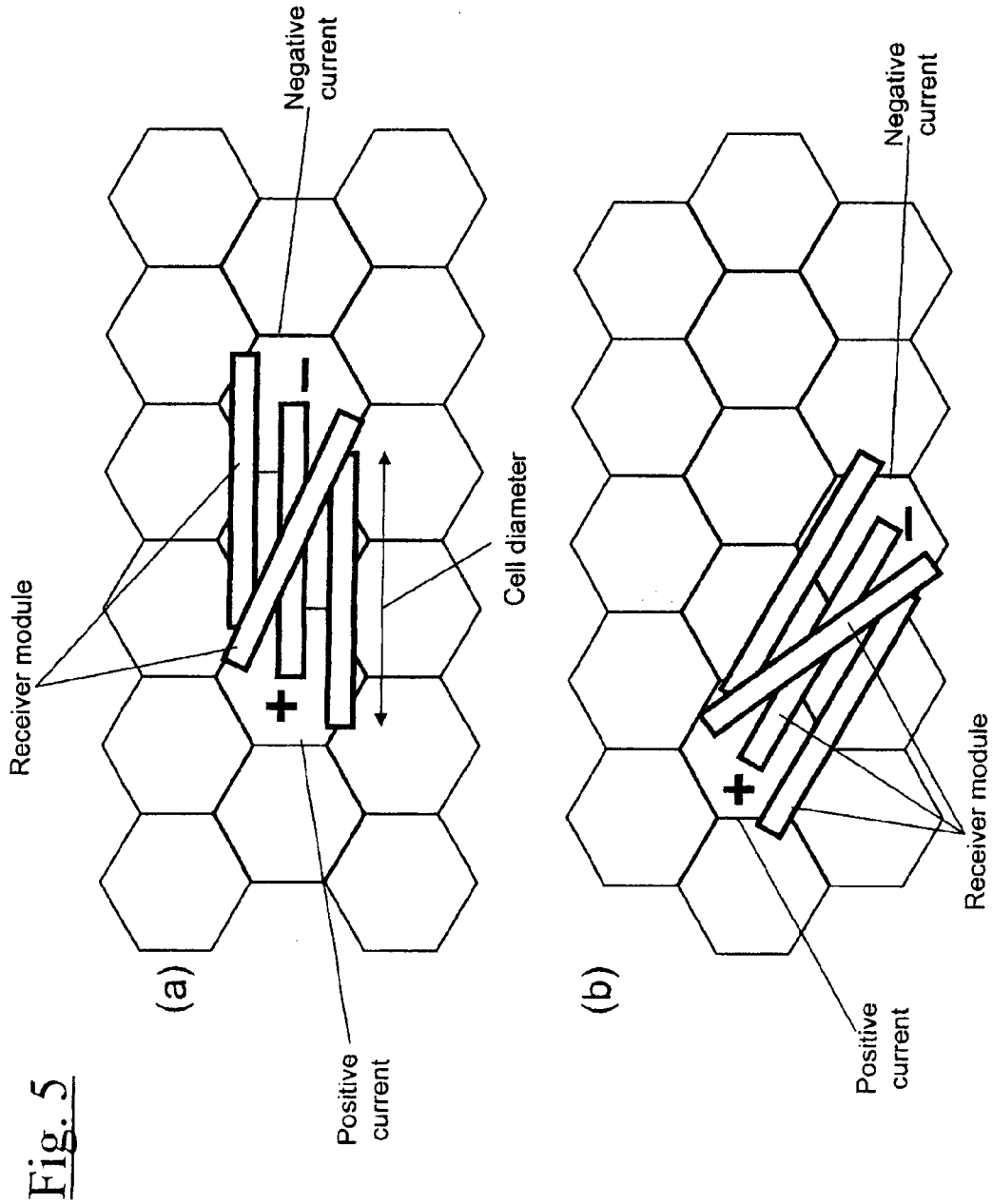
FIG. 5 shows configurations for transferring power to a power receiver.

FIG. 5 illustrates how a power receiver can be powered in different positions by activating just two coils on the pad. For the case of energising only 1 pair of coils (one positive and one negative), there are two distinct geometries, shown in FIGS. 5(a) and 5(b). The range of permutations of negative coils to energise with any given positive coil is limited to a maximum of twelve 'second nearest neighbour' cells.

Figure 6:
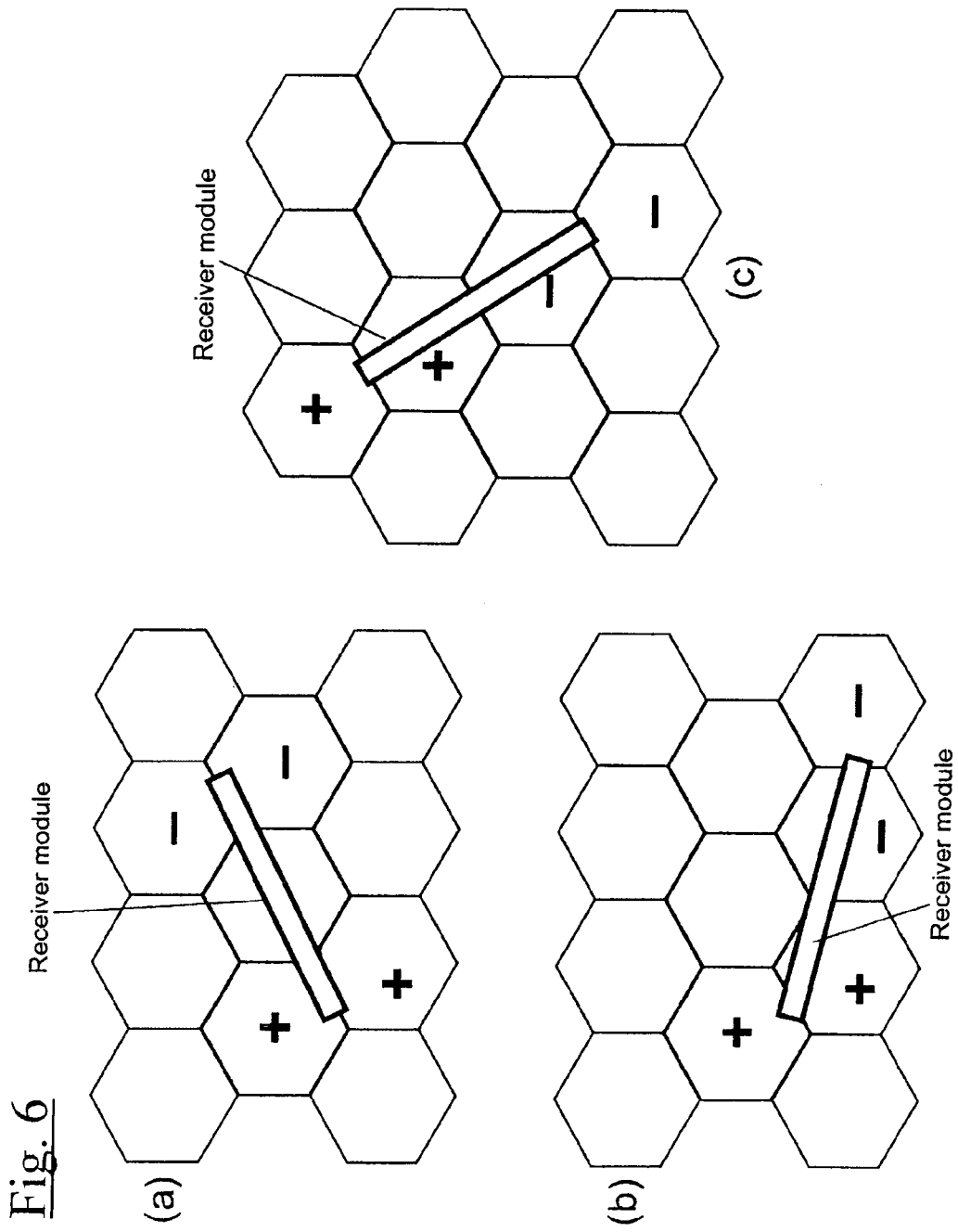
FIG. 6 shows configurations for transferring power to a power receiver.

FIG. 6 illustrates how a power receiver can be powered using two pairs of coils. Using two pairs, there are 10 distinct geometries, though only 5 or 6 are practical. Three of these are shown in FIGS. 6(a), 6(b) and 6(c).

Figure 7:
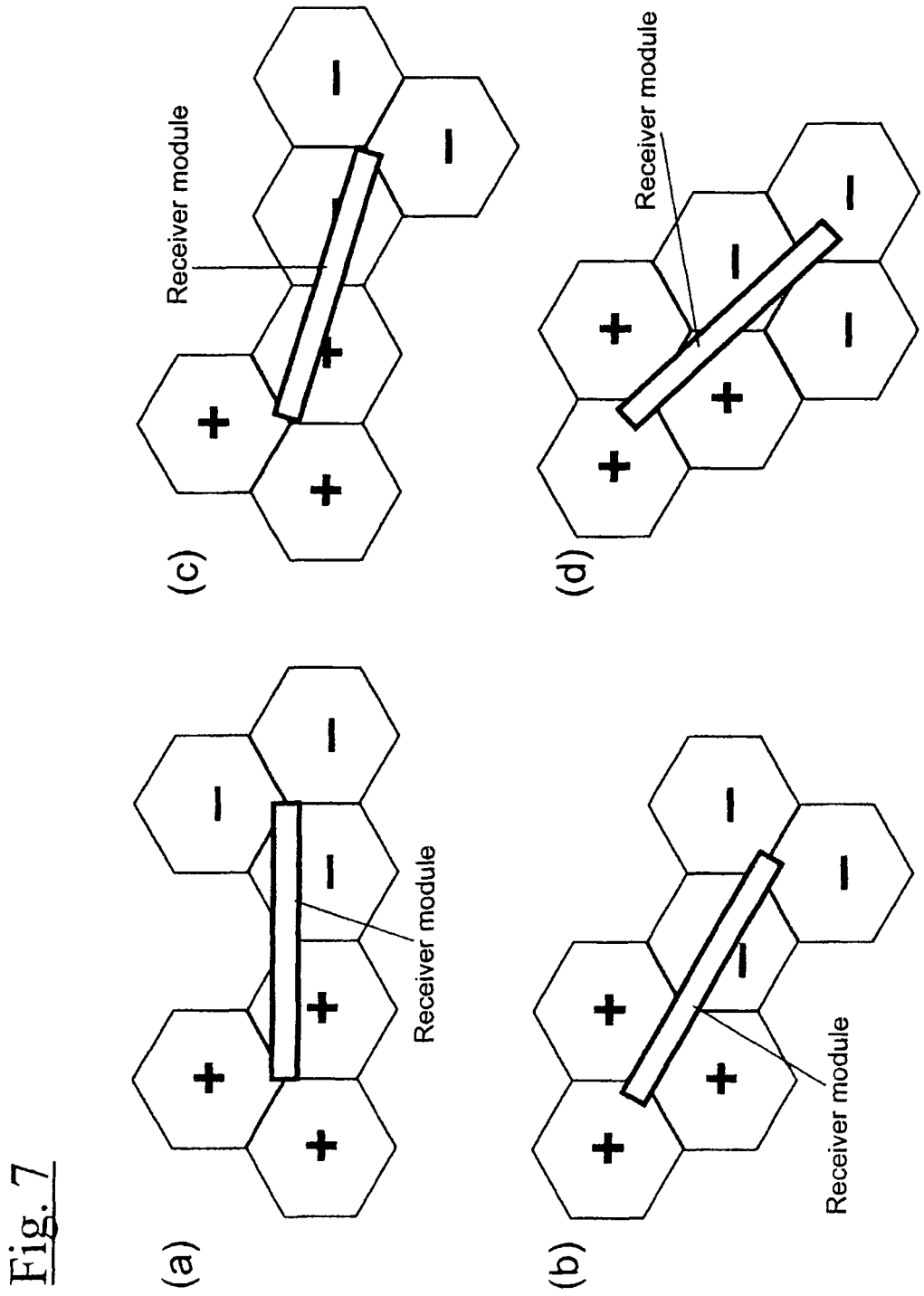
FIG. 7 shows configurations for transferring power to a power receiver.

FIG. 7 illustrates how a power receiver can be powered using three pairs of coils. With three pairs there are 4 distinct geometries, shown in FIGS. 7(a), 7(b), 7(c) and 7(d). In practice only 7(a) and 7(b) give good coupling.

For a given position of the power receiver on the charging surface, there are a number of possible driving arrangements that can be used. As more pairs of coils are used, the maximum coupling coefficient goes down, but the variation in coupling gets less. It is possible to keep the number of pairs used fixed, or it is possible to use a different number of pairs, depending on the precise position and orientation of the power. For example it is possible to keep the minimum coupling above 0.2 and keep the variation in coupling to 70% by always using two pairs.

Figure 8:
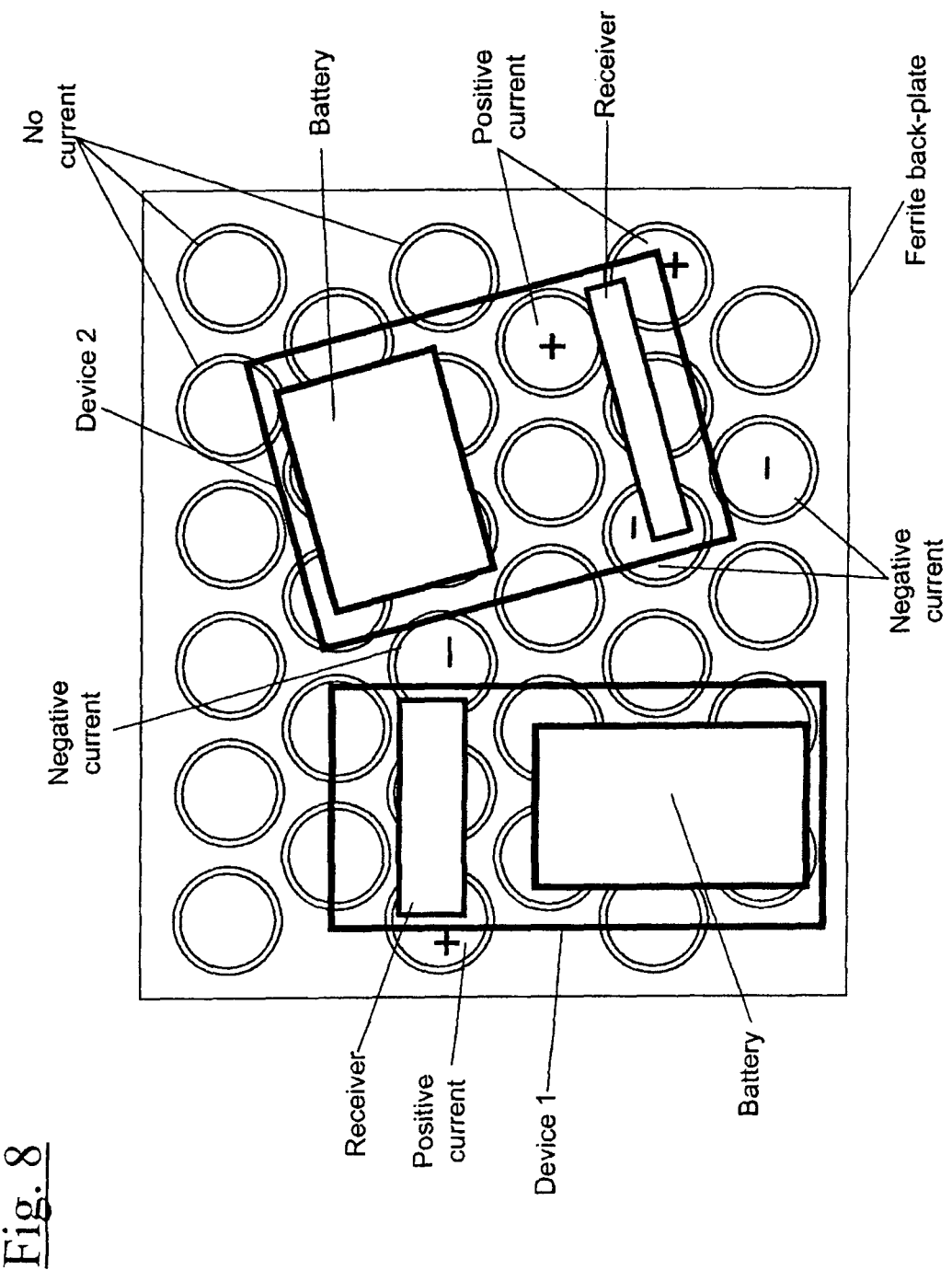
FIG. 8 shows portable devices being charged by the present invention.

FIG. 8 shows portable devices with integrated power receivers receiving power from the charging pad. The pad is large enough for multiple devices to be charged simultaneously. In the example one device is being charged by 1 pair of coils and another device is charged by 2 pairs. The two devices also have different sized receivers and may have different power requirements. Importantly, the field is localised in the region of the active coils, such that the battery is not substantially within the magnetic field.

Figure 9:
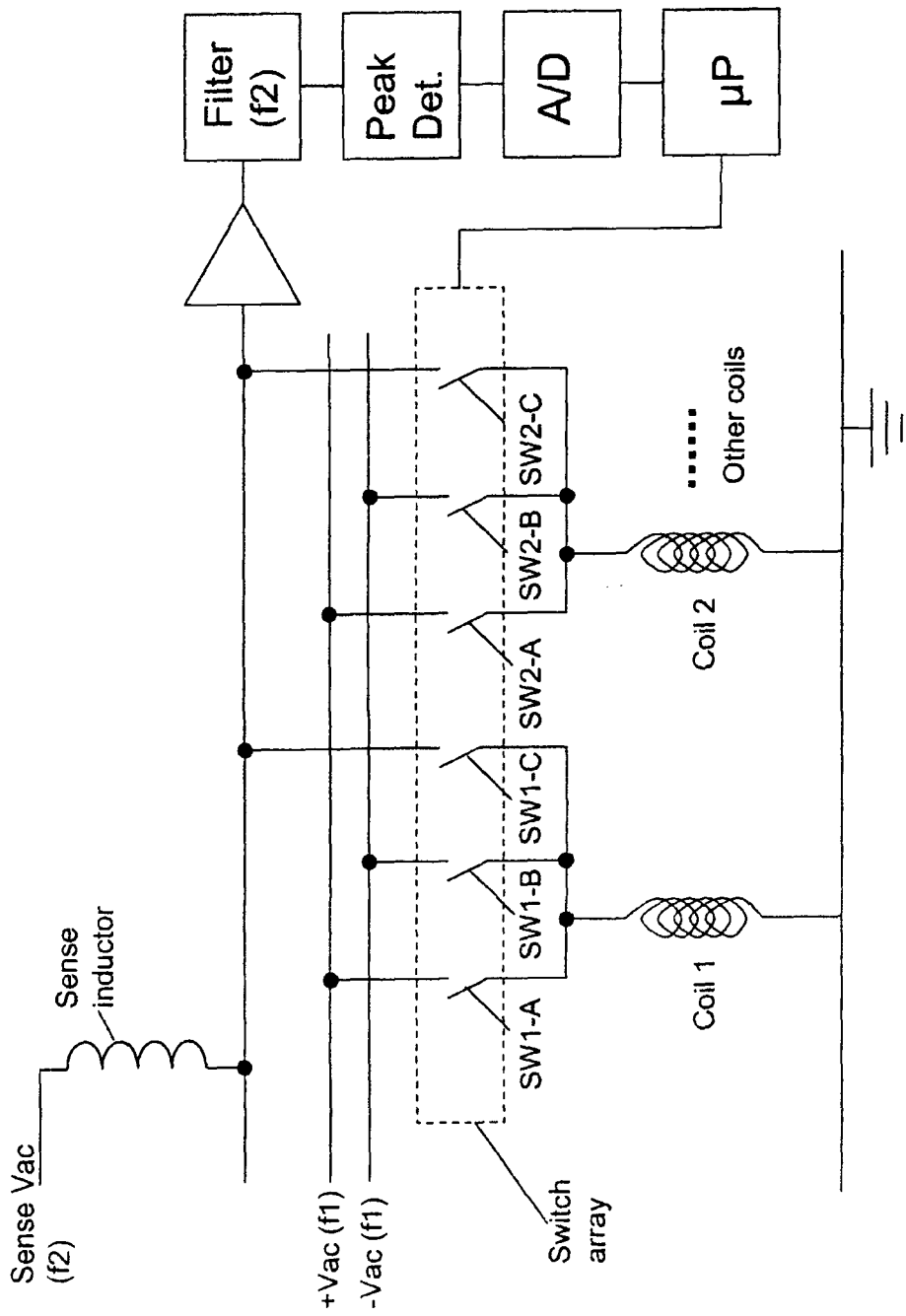
FIG. 9 shows the electrical configuration of the charger.

FIG. 9 shows an arrangement for sensing the position of the device coil and switching the appropriate coils on the charging pad. The array of coils on the charging pad are represented electrically (coil 1, coil 2, etc.). Connected to each coil, there are 3 switches (SWx-A, SWx-B, SWx-C), controlled by a microprocessor (μP). The first two switches (SWx-A and SWx-B) are used to drive the coil. Switch SWx-A is used to connect the coil to a 'positive' alternating current, supplied by alternating supply +Vac. Switch SWx-B is used to connect the coil to a 'negative' alternating supply (−Vac). The third switch (SWx-C) is used for sensing which coils are to be activated. When SWx-C is closed, an inductance bridge is formed across a sense voltage source (Vsense), a sense inductor and the coil. A peak detector is used to determine the magnitude of the voltage at the midpoint of the bridge. This is in turn converted to a digital signal for the microprocessor with the analogue to digital converter (A/D). When a power receiver is placed on the pad, the self-inductance of the pad coils in the vicinity of the receiver will increase. This is because the presence of the ferrite in the receiver reduces the reluctance of the magnetic circuit compared to air. This increase in coil inductance results in a higher ac voltage from the inductive bridge and a higher signal at the microprocessor.

The AC voltage used for the sensing (Sense Vac) is preferably at a different frequency to the power transmission. It is preferably at a submultiple of the power transmission frequency, such that the harmonics overly those of the power transmission. It is possible that there may be some 'breakthrough' of power at the power transmission frequency into the sense circuit. This arises because of stray coupling between individual coils in the system. This can be prevented by inserting a filter in the sense path after the peak detector.

The power transmission switches (SWx-A, SWx-B) need to be able carry large powers. However, they do not need to be switched very fast, as they will only switch when a device is moved onto, off or around on the pad. The switches used for sensing (SWx-C) can be of a much lower power handling capability as they only need to pass the low level sense signal. It may be desirable to have faster switches for SWx-C so that the switches can be scanned fairly rapidly. This reduces the latency in the charger responding when a device is placed on the pad. Consequently, it may be desirable to use different technologies for the power switches and the sense switches. For instance relays (or MEMS) switches could be used for the power (as they need high current, but slow speed) and semiconductor MOSFET switches could be used for the sense (as low current but faster switches are needed).

Figure 10:
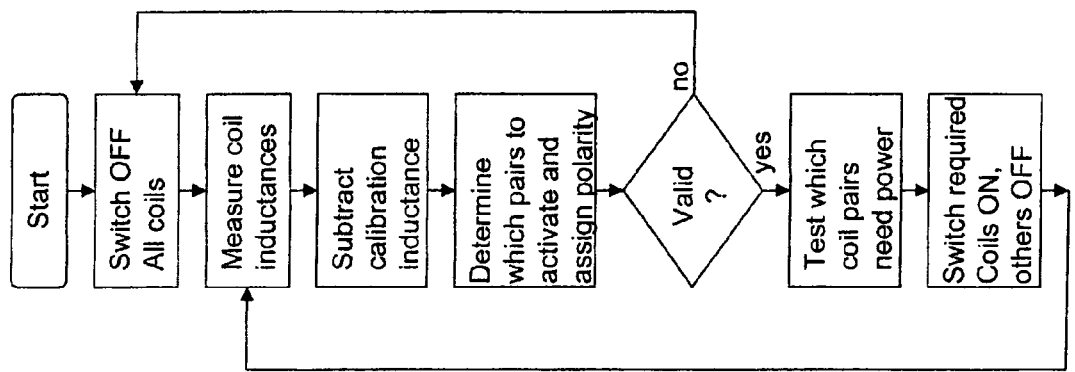
FIG. 10 shows a flow diagram for operating the charger.

In order to determine which coils should be activated an algorithm in the microprocessor is used to measure the coil inductances and activate the appropriate coils. It is first necessary to calibrate the system by measuring the inductance of each coil when there are no devices in proximity to it. This would typically be done at the factory, but it may be desirable to be able to re-calibrate at a later date. FIG. 10 shows an example top-level algorithm for activating the relevant coils. The system is powered up and all the coils are switched off. The inductance of each coil is measured. The calibration value is subtracted to obtain the inductance change. From the pattern in inductance changes observed over the pad, the microprocessor determines the position of the secondary coils within each device. It uses this information to determine which pairs of coils to activate. Each coil within each pair is assigned a different polarity. The microprocessor may determine that the size and/or position of an individual device requires more than one pair to be activated. A check is made to ensure that the proposed scheme is valid. If not, the entire process is repeated until a valid configuration is obtained. Once there is a valid configuration, each coil pair (that is not already powered up) is momentarily powered up to see how much power is taken. Coil pairs which take power above a certain threshold are powered. Coil pairs which take power below this threshold are switched off. This means that devices which are on the pad but do not require power (e.g. because they are fully charged) are switched off.

Figure 11:
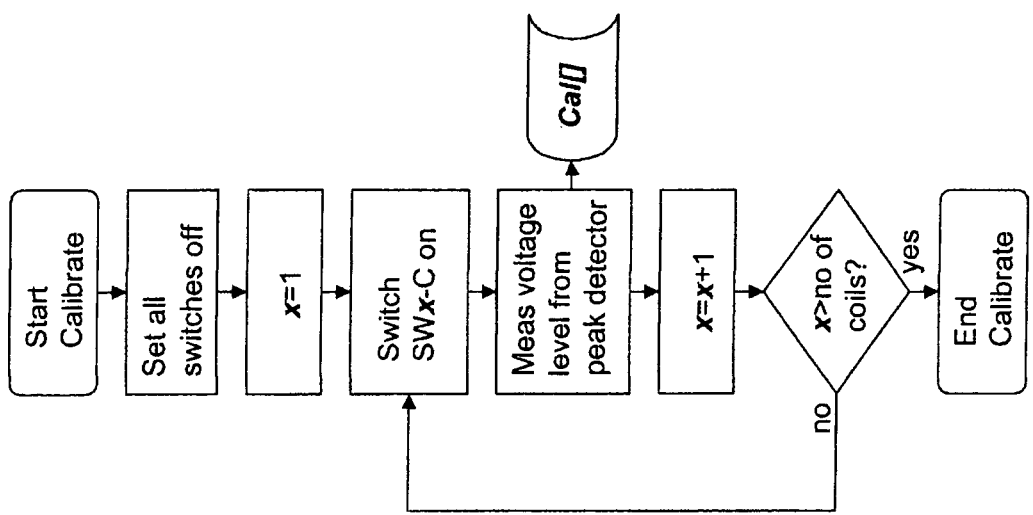
FIG. 11 shows a flow diagram for calibrating the charger.
Figure 12:
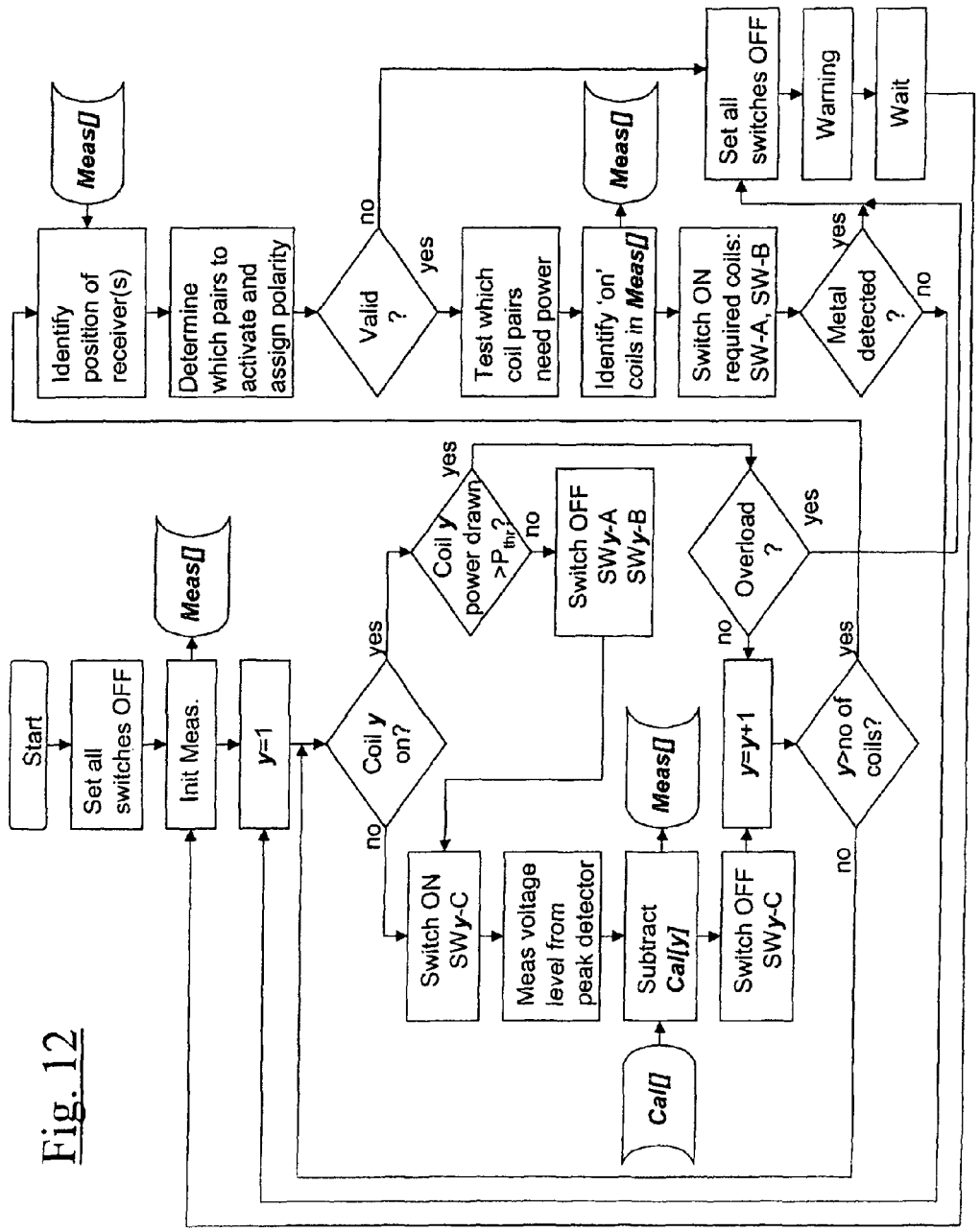
FIG. 12 shows a flow diagram for operating the charger.

More detailed algorithms for the sensing and switching of the required coils are illustrated in FIGS. 11 and 12. FIG. 11 shows a calibration algorithm. The algorithm switches all the switches off. It starts with the first coil. SWx-C is switched on. The voltage is measured at the peak detector. This information is stored in an array (Cal[ ]). It then moves onto the next coil. It finishes once all the coils have been measured. FIG. 12 shows a detailed operation algorithm (it assumes that the calibration algorithm has already been carried out). First all the coils are switched off. It steps through each coil one by one. It first tests to see if the coil is already on. If it is it determines the power drawn and switches it off if below a certain threshold. If the coil is not on, it measures the inductance through the peak voltage detector and subtracts the calibration value. This information is stored in an array (Meas[ ]). Once all the coils have been tested/measured, it determines where the receivers are on the pad. It then determines the required coil pairs to be activated and assigns them polarity. If the arrangement is valid, it tests to determine which pairs require power. It identifies that this coil requires power in the Meas[ ] array, by giving it a token distinguishable from a measurement result. It then switches on the required coils. It would then have a test to determine if there was metal present which was drawing power from the system and presenting a hazard. If there is metal, an overload condition in which a coil was drawing higher power than allowable threshold, or if there was an invalid coil configuration, then all the coils are switched off, the user is alerted with a warning and after a wait period the system resets.

Figure 13:
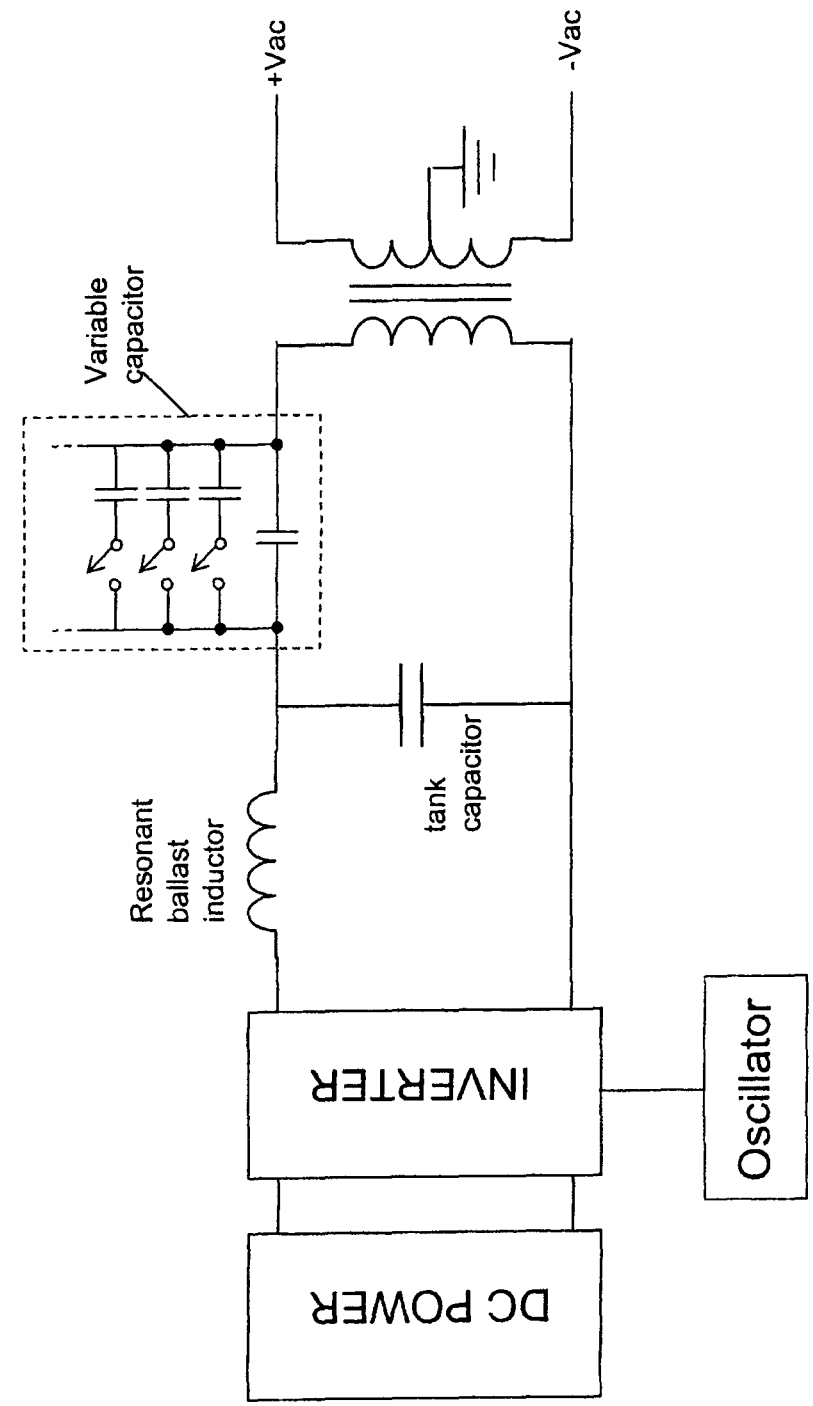
FIG. 13 shows part of an electrical circuit diagram of the charger.

The arrangement of FIG. 9 requires AC voltage signals with high power and opposite polarity. FIG. 13 shows a means of generating these signals. There is a DC power source which is coupled to an inverter to generate an AC signal at a reference oscillator frequency. This is in turn coupled to an inductor and capacitor resonant at the oscillator frequency. This is in turn coupled to a transformer, via a variable capacitor. The output of the transformer has a centre-tap referenced to ground. The two ends of the transformer output provide the positive and negative polarity inputs to the circuit of FIG. 9. A variable capacitor is required because the inductance of the load on the transformer will vary as different coils are switched in and out. It may also varied with different device loads or at different device positions on the pad. The variable capacitor is therefore adjusted to ensure that the system is resonant at the oscillator frequency. In this system, the variable capacitor has been implemented using a switch network, though there are many methods of achieving this.

Figure 14:
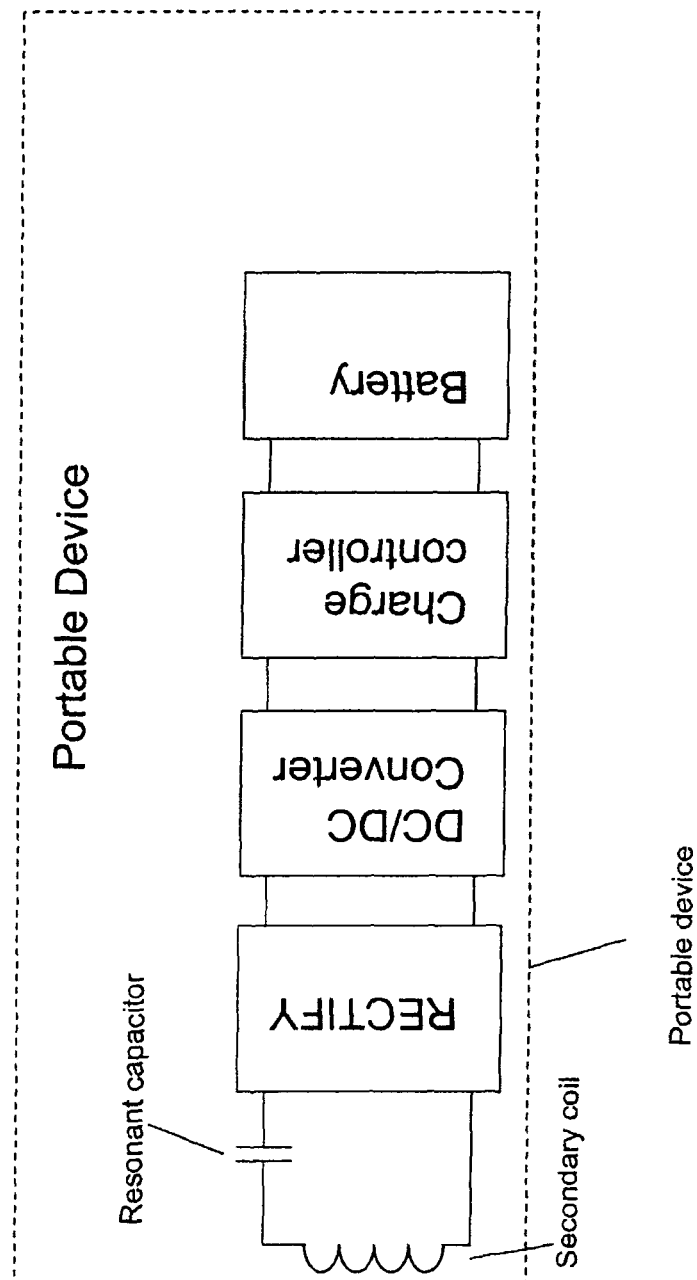
FIG. 14 shows a block diagram of the electronics within the portable device.

FIG. 14 shows an electrical equivalent diagram of a portable device for use with the charging pad. There is a secondary coil (represented by the inductor), a capacitor such that the combination is resonant at the oscillator frequency. This signal is converted to a DC voltage using a rectifier (which may be a bridge rectifier). The voltage is then converted to the required voltage level using a DC/DC converter. This is coupled to a charge controller, which is in turn coupled to a battery. It is sometimes possible to combine the DC/DC converter and charge-controller into a single element.

So far only a single implementation of the system has been shown. In practice there are a variety of different magnetic arrangements that can be used; a variety of sensing methods and a variety of switching methods. To some extent these can be chosen independently from one another, though it is desirable to optimise the system as a whole.

Figure 15:
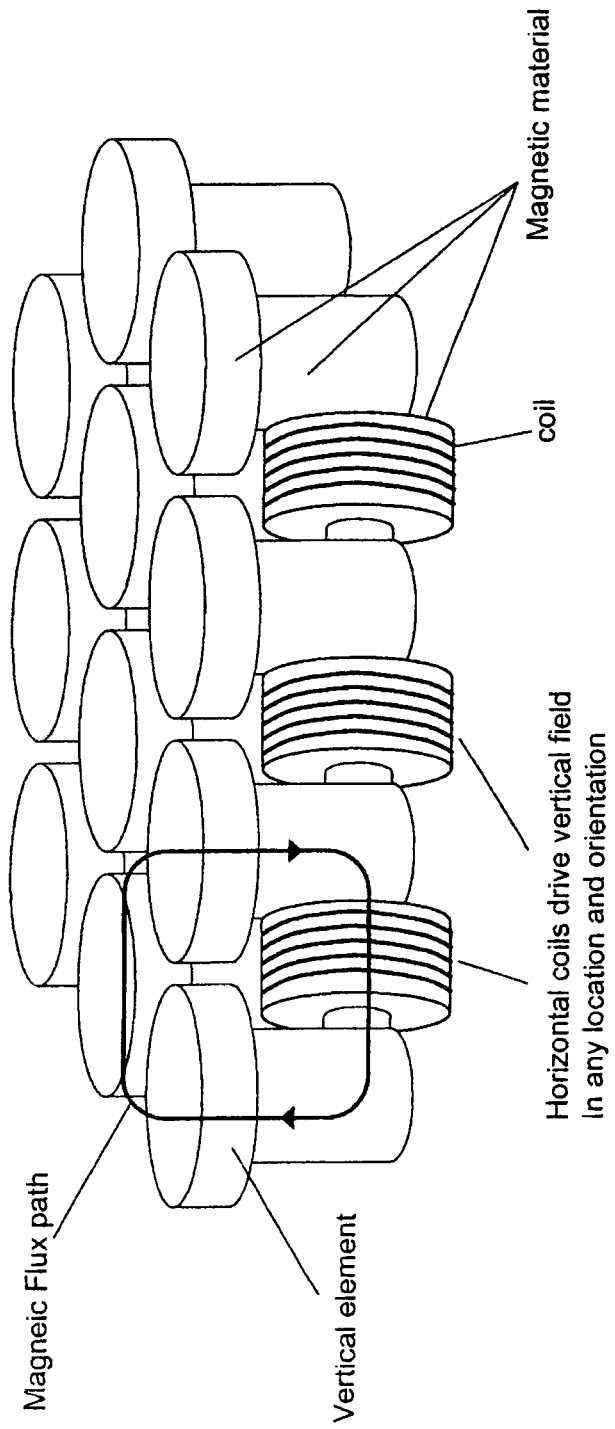
FIG. 15 shows an alternative charger configuration.

FIG. 15 shows an alternative magnetic arrangement. In this arrangement the charger still has an array of vertical field generating elements. However, the actual coils driving them are arranged with their axes horizontal, parallel to the charging surface. Flux couples from the horizontal driven coil into the vertical pillars of magnetic material. When a secondary device is placed on the charging surface, it completes the magnetic circuit, such that the magnetic material forms approximately a closed loop (apart from the gap between the device and charger plastic housings). The coil wound around the magnetic material within the secondary device, with an axis horizontal relative to the charging surface couples to the field generated, allowing power to be transferred.

Figure 16:
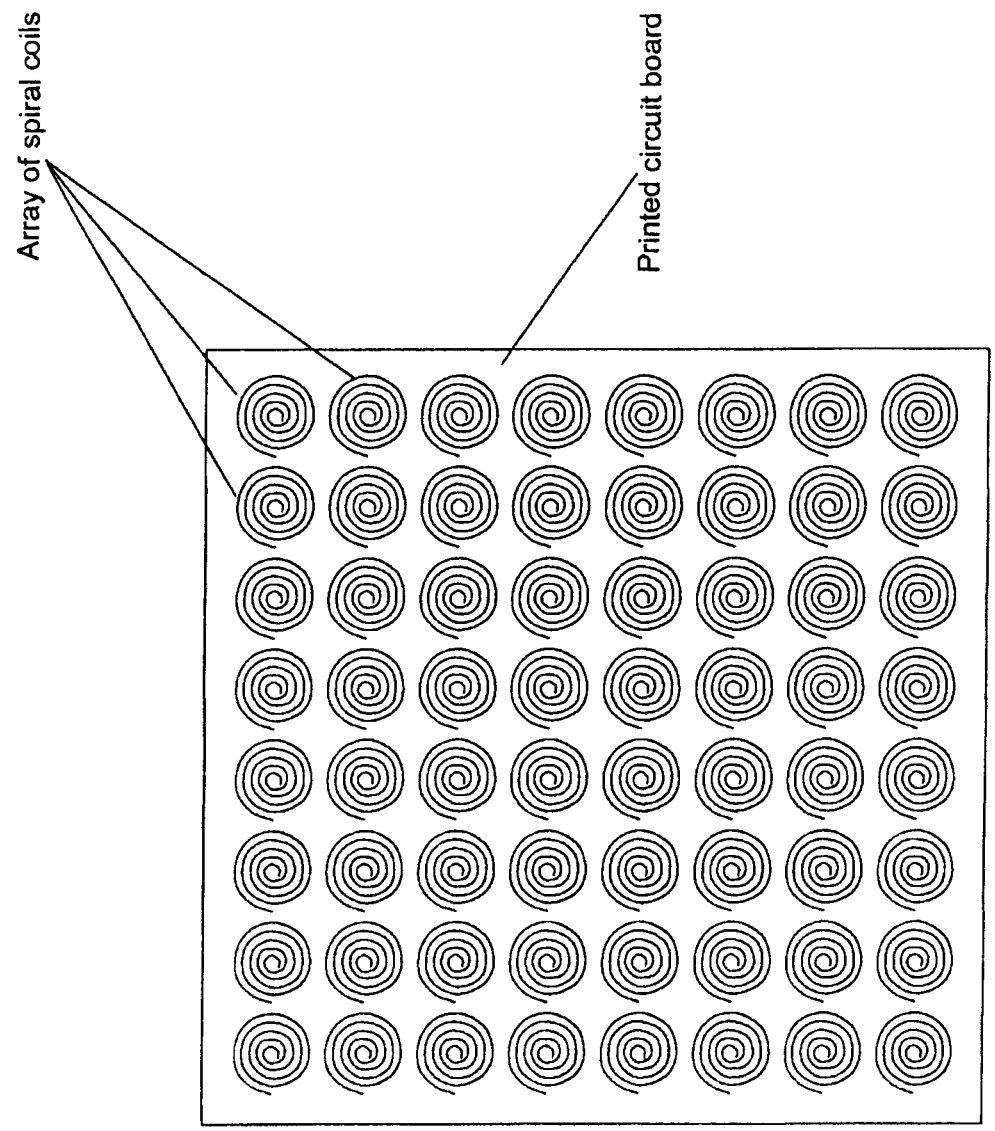
FIG. 16 shows an alternative charger configuration.

FIG. 16 shows a charger formed using a PCB implementation. In this arrangement there is an array of planar spiral coils used to generate the vertical fields. Typically multiple PCB layers would be used, each having an array of coils. These coil arrays would be aligned with each other to enhance the magnitude to the field generated. A ferrite back plate would typically be required to complete the magnetic circuit. It may be desirable to have holes in the centre of the spiral, which could accommodate cylinders of magnetic material.

Figure 17:
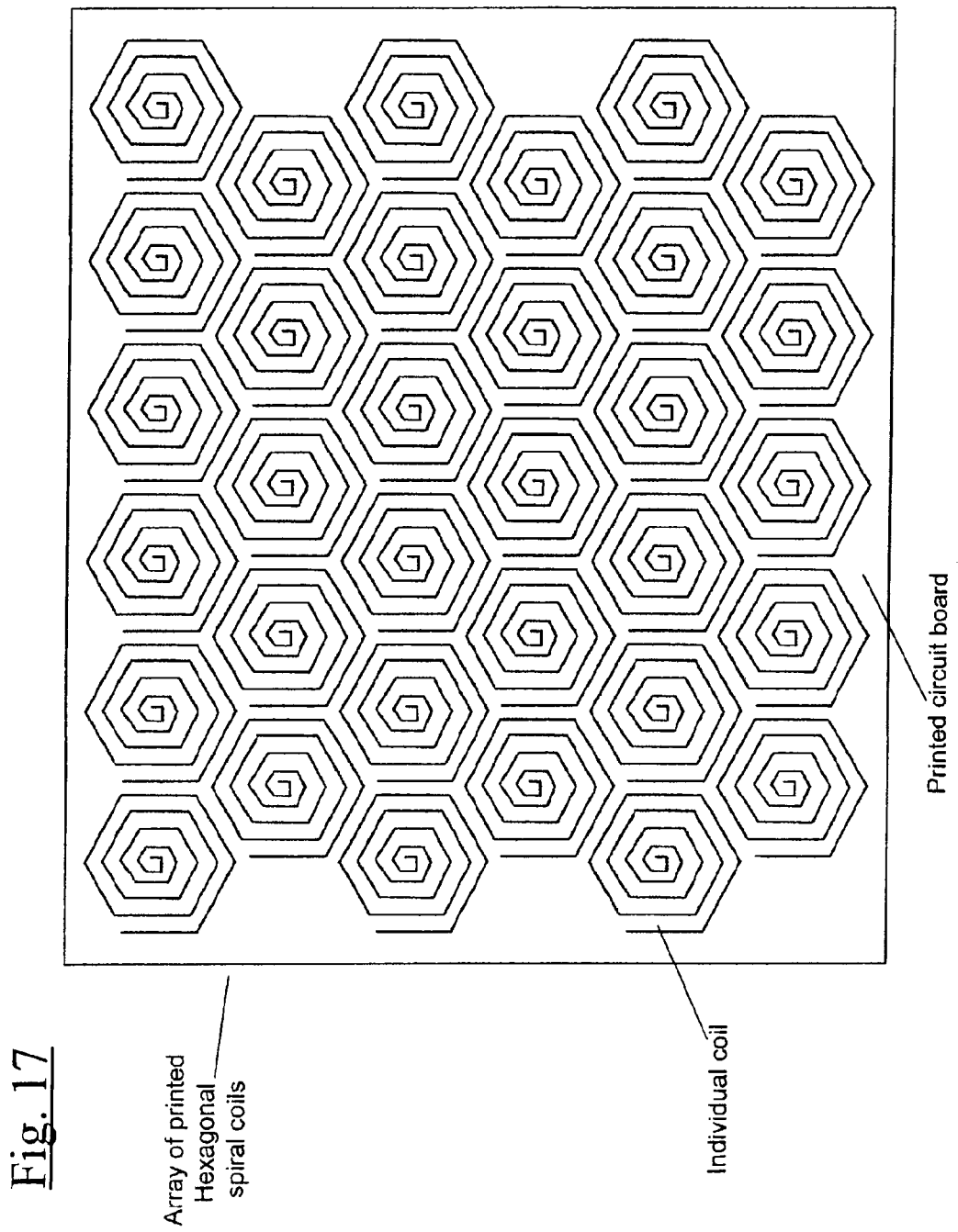
FIG. 17 shows an alternative charger configuration.
Figure 18:
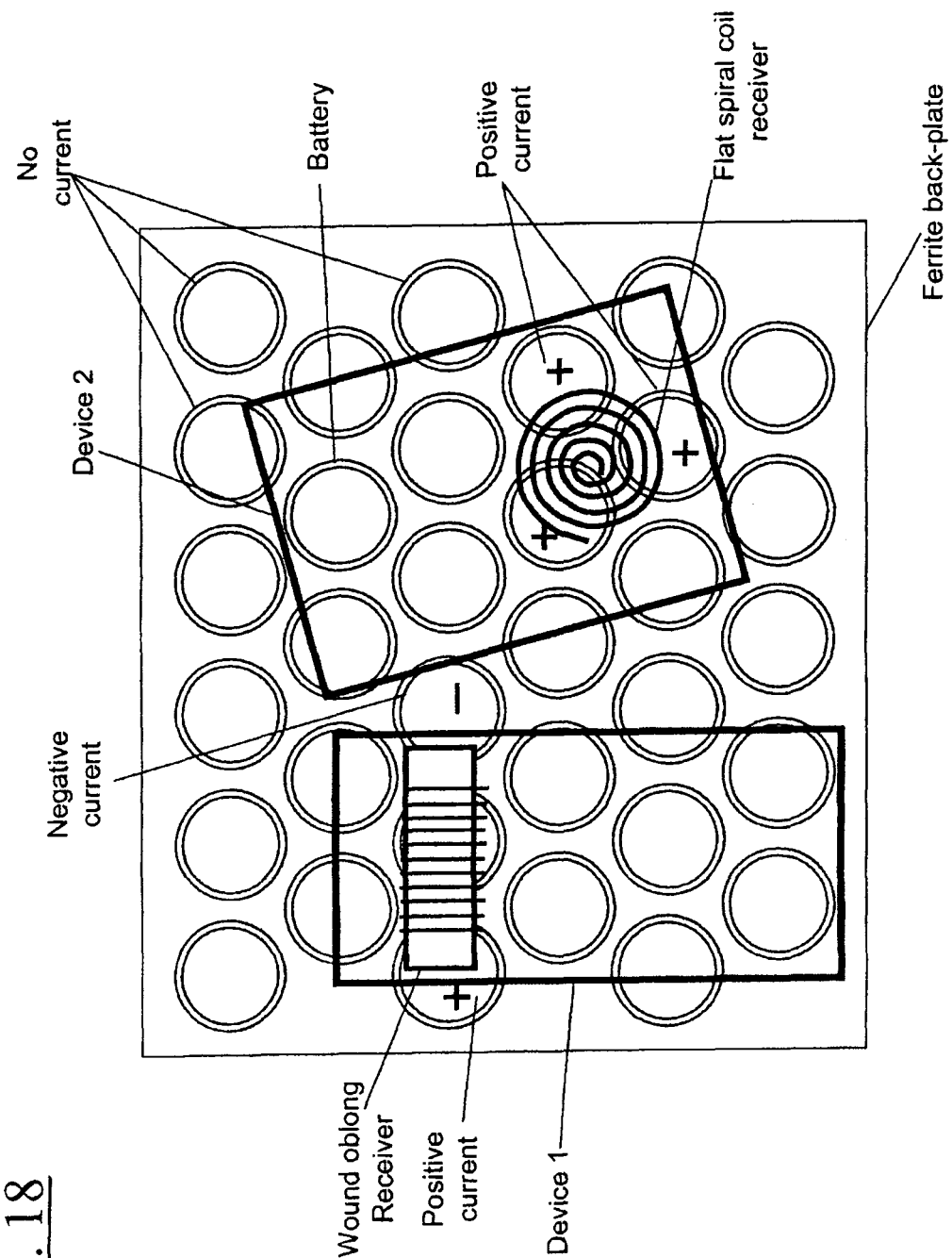
FIG. 18 shows an alternative charger configuration.

FIG. 17 shows another PCB implementation. However, this system uses an array of hexagonal coils which are close-packed together, FIG. 18 shows a hybrid charger system. This system allows two different types of receiver within the portable device to be used. Device 1 has a horizontal coil axis, wound around magnetic material. However, device 2 uses a flat spiral coil as its power receiver. The two different types of coils are powered in different ways. Device 1 is powered by powering pairs of positive and negative polarity coils as before. Device 2 is powered by powering a group of coils with the same polarity. Device 2 therefore receives a vertical field directly. Instead of having a flat spiral coil, device 2 could simply have a wound coil, but with the coil axis perpendicular to the charger surface. It may be necessary to vary the number of coils powered for device 2. Using the same charger platform, it is possible to power different types of receiver either separately of simultaneously. The two different types of device could be used to accommodate different shaped portable devices. Alternatively the system could be used to power devices from different manufacturers which operate on different standards. It may be necessary for the portable device to communicate what type of receiver it is to the charger, so that the charger can correctly determine which coils should be activated and with what polarity configuration.

Figure 19:
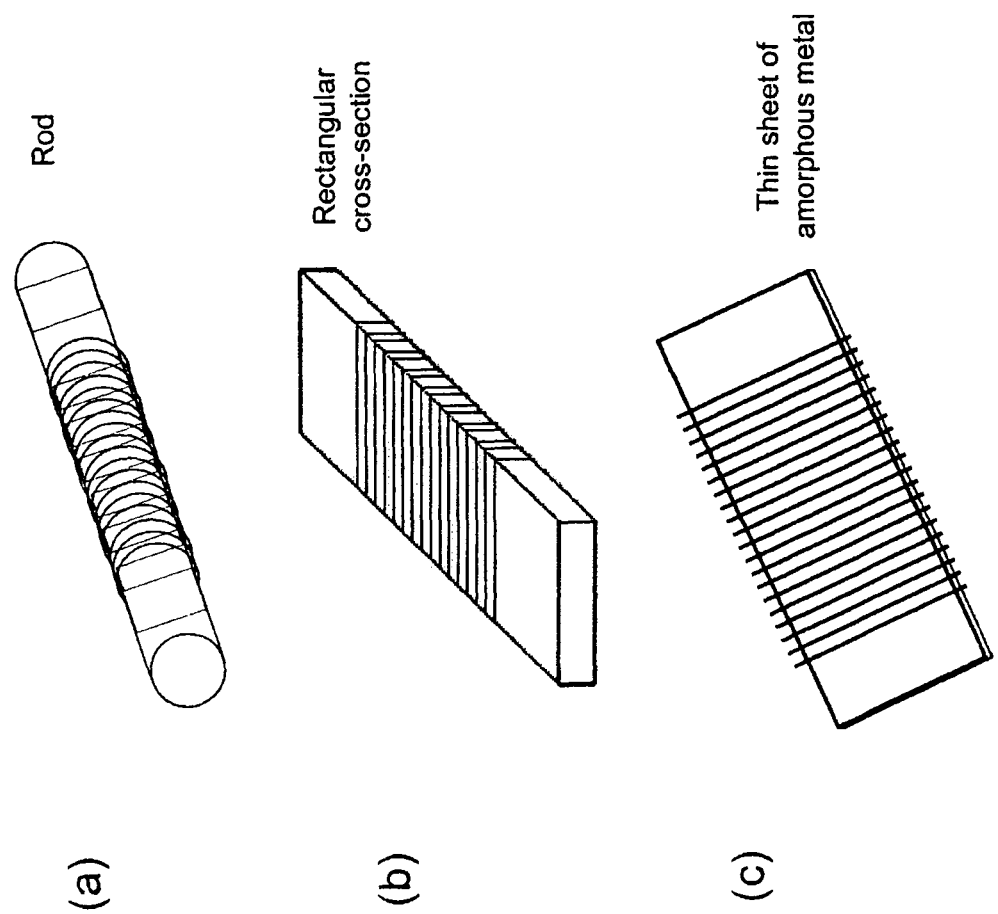
FIG. 19 shows different types of power receiver.

FIG. 19 shows a range of different types of receiver, designed so that the coil axis is parallel to the charging surface, when the portable device is being powered. FIG. 19(a) is a cylindrical rod structure; FIG. 19(b) is a rectangular rod structure; FIG. 19(c) is a thin sheet of amorphous metal, with coil wrapped around it. In practice multiple sheets of amorphous metal would be used, preferably separated by insulating material.

Figure 20:
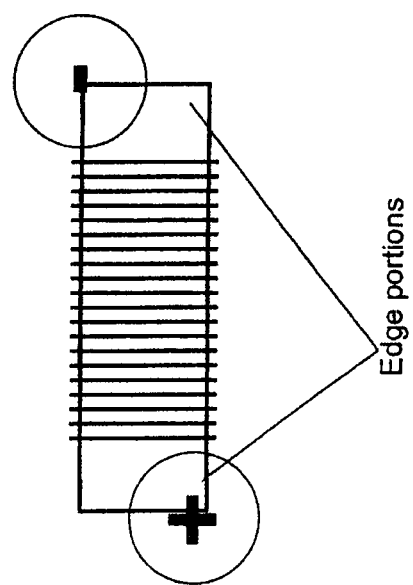
FIG. 20 shows a power receiver and coils within the charger.

FIG. 20 shows a plan view of a receiver, which could relate to any of the configurations in FIG. 19. It is preferable that the coil winding does not go all the way to the ends of the magnetic material. When the device is placed on the charger, it is desirable to power elements which overlap the edge portions (without the coil). This ensures that there is no voltage generated at the ends of the coil which opposes the main voltage received.

Figure 21:
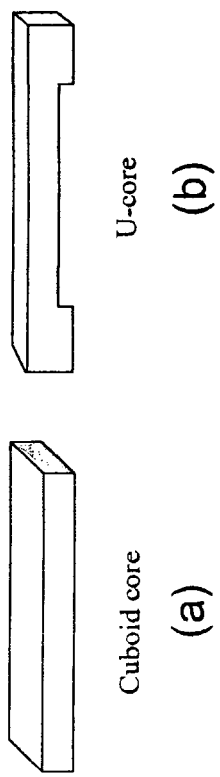
FIG. 21 shows magnetic cores of different shapes.

FIG. 21 shows that it is possible to use either a simple cuboid core (a), or with some advantage a U-shaped core (b). The U-shaped core allows the magnetic material of the device to get closer to the magnetic material of the charger, thereby reducing the reluctance of the magnetic circuit. The U-shaped core does this by providing room for the coil winding.

The use of a horizontal secondary is advantageous for several reasons. Firstly, the form factor is convenient for integration either on the base or back of a mobile device. Secondly, the elongated shape enables concentration of the magnetic field. This relates to the high effective permeability due to high shape-factor/low self-demagnetisation. This enables a smaller secondary to be used for a given power loss.

Although it is preferable to use magnetic cores for the array of coils in the charger, it is not essential. It is possible to omit these cores to get a lighter and cheaper system, but at the expense of reduced magnetic efficiency.

Figure 22:
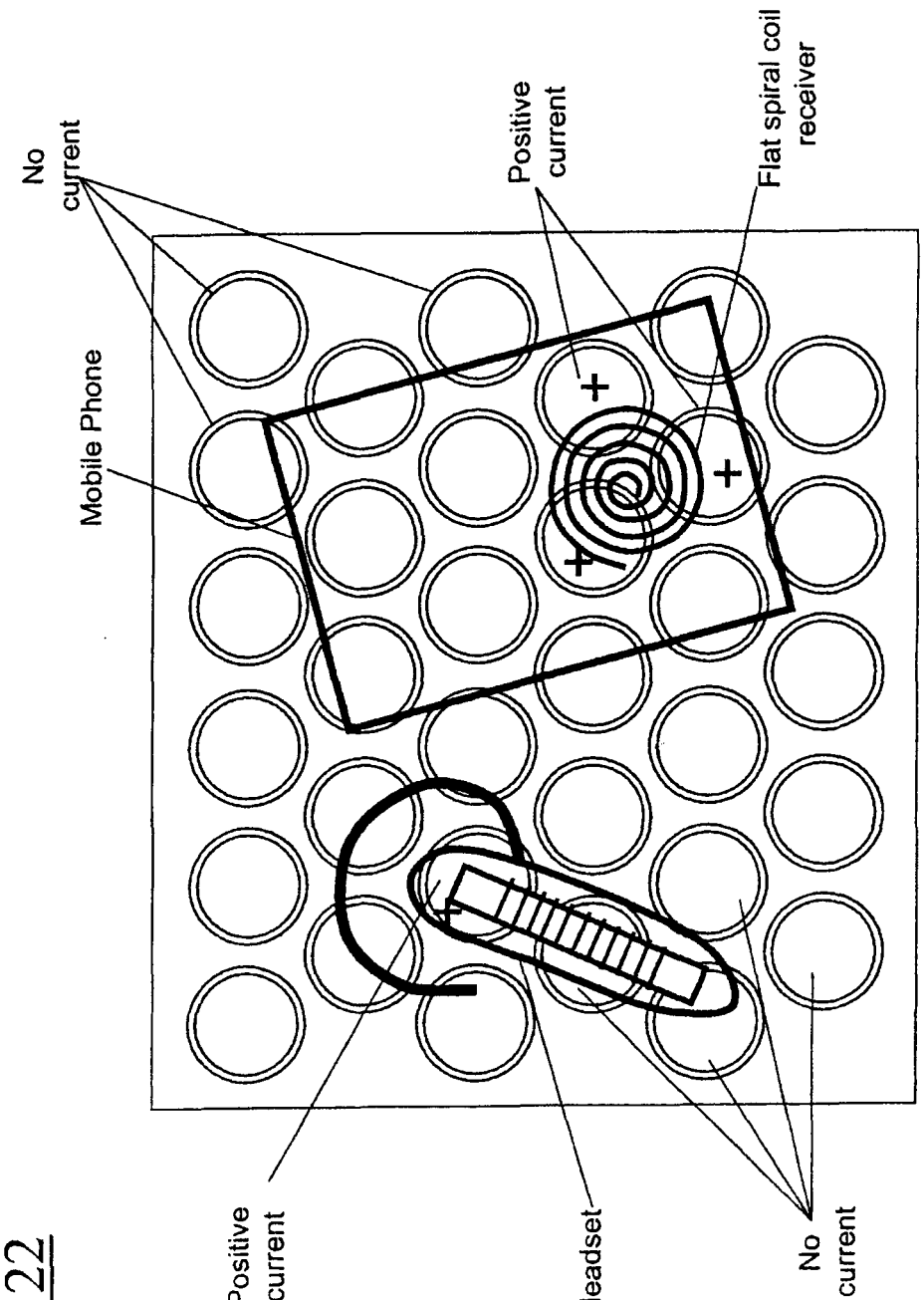
FIG. 22 shows different types of power receiver on the charger.

Although it is best to drive pairs of coils in the charger in a 'push-pull' fashion in order to power a receiver with a horizontal coil (parallel to charger surface), it is also possible to use just a single coil polarity in the charger. This can be thought of as exactly the same system, but with one of the 'drivers' switched off. The magnetic circuit should be broadly the same. However, the efficiency will be much reduced. For lower power devices however, this may not be so much of an issue. One configuration is shown in FIG. 22. The majority of devices may have spiral coils (or flat wound coils). However these coils may be too large to fit within a headset. Instead the headset could have a long thin coil. This coil could be powered with a dual polarity system. Alternatively it could be powered simply by powering one of the coils (in the same polarity as the other devices). Although the efficiency is lower, the power requirement of the headset is much lower, so the reduced efficiency does not cause a problem. However, only needing to supply one polarity in the system would afford a significant reduction in complexity and cost.

Figure 23:
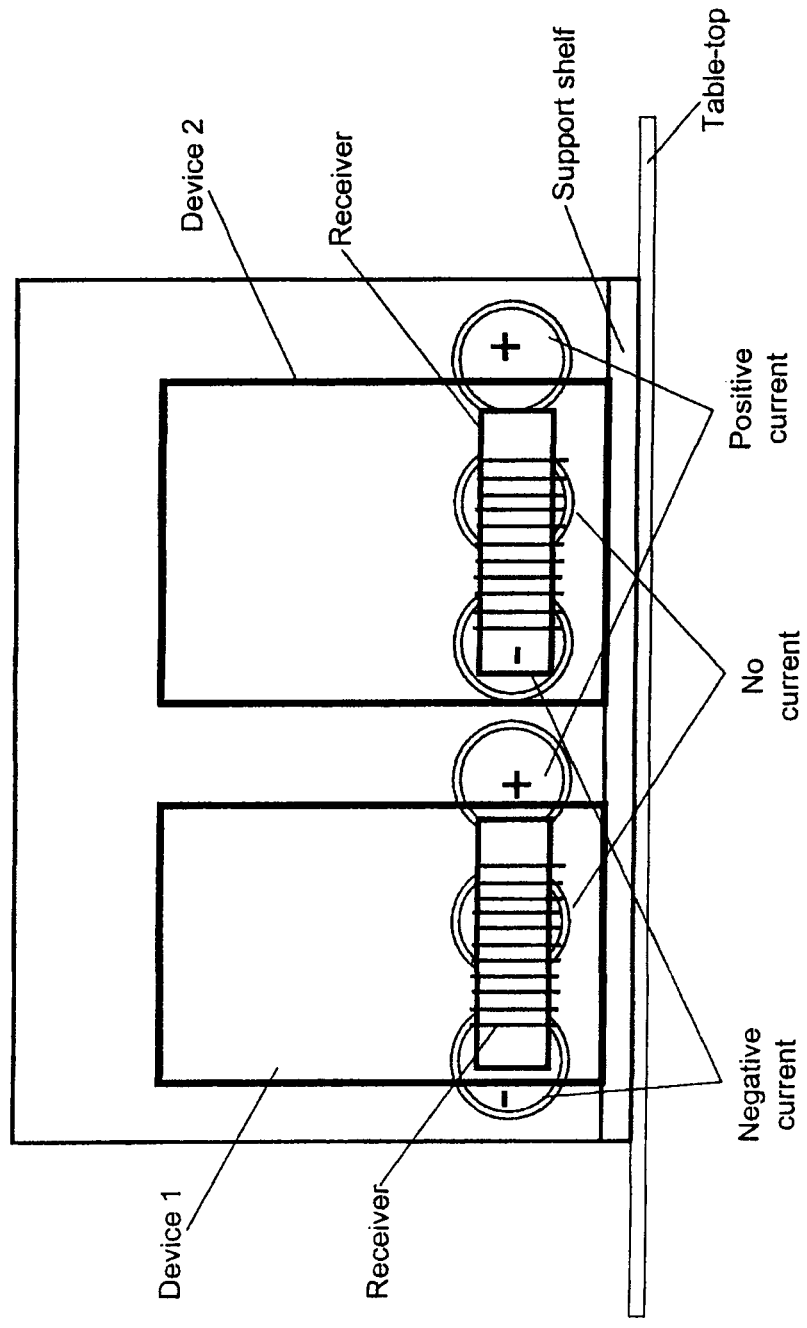
FIG. 23 shows an alternative charger configuration.

FIG. 23 shows a simpler and lower cost alternative to a flat pad charger. This system requires only a single line of coils. The charger is in the form of a shelf, such that device stand upright on a ledge. The ledge may tilt back slightly to prevent the devices from falling off. The receiver is positioned in the portable device a set distance away from the bottom edge. Thus there is always alignment in one dimension. Depending on which part of the shelf the device is placed, different coils are accordingly activated. The shelf allows devices to be placed anywhere along a line. Further, it allows multiple devices to be charged simultaneously, Wound Litz-wire primaries are the ultimate solution for low primary losses. Wound components with or without ferrite cores can be used. Ferrite cores can be added to give a small shape-factor benefit (if cost-effective) and to produce an even flatter coupling factor. However, overall cost and manufacturability is less attractive. Other planar coil technologies such as PCB coils or watch-spring coils can be used to reduce cost, but typically exhibit higher losses (lower coil Qs).

The vertical cores can be hollow, to reduce cost and weight, as the overall flux density is not high enough to require a solid part. A ferrite back-plate may be used behind the vertical cores to act as a flux return path, and this improves the coupling factor. However the system can operate without this back-plate, and doing so reduces cost and weight. The permeable material from which the cores and/or back-plate are manufactured is preferably Mn—Zn ferrite, but other magnetic materials such as iron powder cores, carbonyl iron, amorphous metal, nanocrystalline metal or magnetic composites could be used.

A key feature of this invention is that it uses a highly localised field to reduce unwanted inductive heating of nearby metal parts and interference with other electronic systems. It also provides a scalable system that can be extended to almost any pad size by tessellation of the selectable drive coils.

The system can also be configured to operate with pancake-type secondary coils, without changing the primary magnetics and switching hardware. Such a system allows third-party manufacturers to choose a secondary type that fits with available space and power requirements of their product.

Sensing of the location and orientation of one or more receiver coils within a portable device may be accomplished, for example, by one of the following methods:

1. Measure the change in primary coil self-inductance due to presence of the secondary coil in the device.
2. Measure the change in mutual inductance between nearby primary coils in the charger. This entails selecting each coil in turn and measuring the mutual inductance between that coil and other nearby coils (within the range that the receiver could interact with).
3. The portable device emits a test signal which is picked up by the charger at multiple points. The charger determines the receiver's position by triangulation.
4. The portable device picks up test signal from the charger and reports back the signal strength via a separate communications channel (e.g. Bluetooth), which reveals its location.
5. Inductive communications using the primary and secondary coils. For example, secondary has dual use as an RFID tag antenna, and the position is detected using the RFID channel.
6. The resonance of the secondary circuit (e.g. a tuned LC resonator) produces a detectable response to a pulse from the primary (e.g. by a ringing oscillation)
7. A non-linearity in the signal is detected, e.g. from saturating the secondary core with a large DC field, or due to secondary rectification circuits.
8. The secondary coil in the receiver produces an occasional load modulation, which can be detected by the primary circuit
9. Short-circuit the secondary coil in the receiver at low voltages to produce a high Q resonator signal.
10. Measure the phase lag due in signal response, which varies as the frequency is swept.
11. Separate inductive sensing coils, for example on a thin printed circuit. These can be low voltage, and hence cheaper to switch.
12. A separate sensing method e.g. using a magnetic tagging technology, optical markers, a touch-screen position sensing technology, capacitive sensing etc.

The position of the secondary is sensed and then power is transferred by switching on the appropriate primaries. The sensing may be performed by switching on each of the primaries in turn and looking for a characteristic response from the secondary circuit or it could be achieved by some separate means.

The primary coils would typically be driven from a half-bridge drive, to generate a square-wave at the required frequency. This may be 'routed' to the appropriate coils using a matrix of MOSFET switches. This means that a single high-frequency square-wave driver can be shared amongst all the coils. The routing switches will be very low frequency and static as long as the device is stationary on the surface. The negative phase can be achieved by routing it in the opposite direction or by using a second square-wave driver with an output complimentary to the first.

Alternatively, each coil could have its own high frequency power MOSFET which is driven directly. This means that different modules could be driven with different amplitude signals in order to reduce the voltage variation seen on the secondary side.

Each device could be powered by driving just two primary coils, those being the nearest to each end of the module. However, it may desirable to drive more than two coils, particularly where one end does not precisely align to a single coil. In order to further refine the coupling it may be desirable to have different amplitude signals to different primary coils that are coupled to a single module. Yet further refinement is possible if the phase can be independently adjusted between coils.

There are a number of alternative arrangements for providing the power for the coils and switching this power to the required coils.

Figure 24:
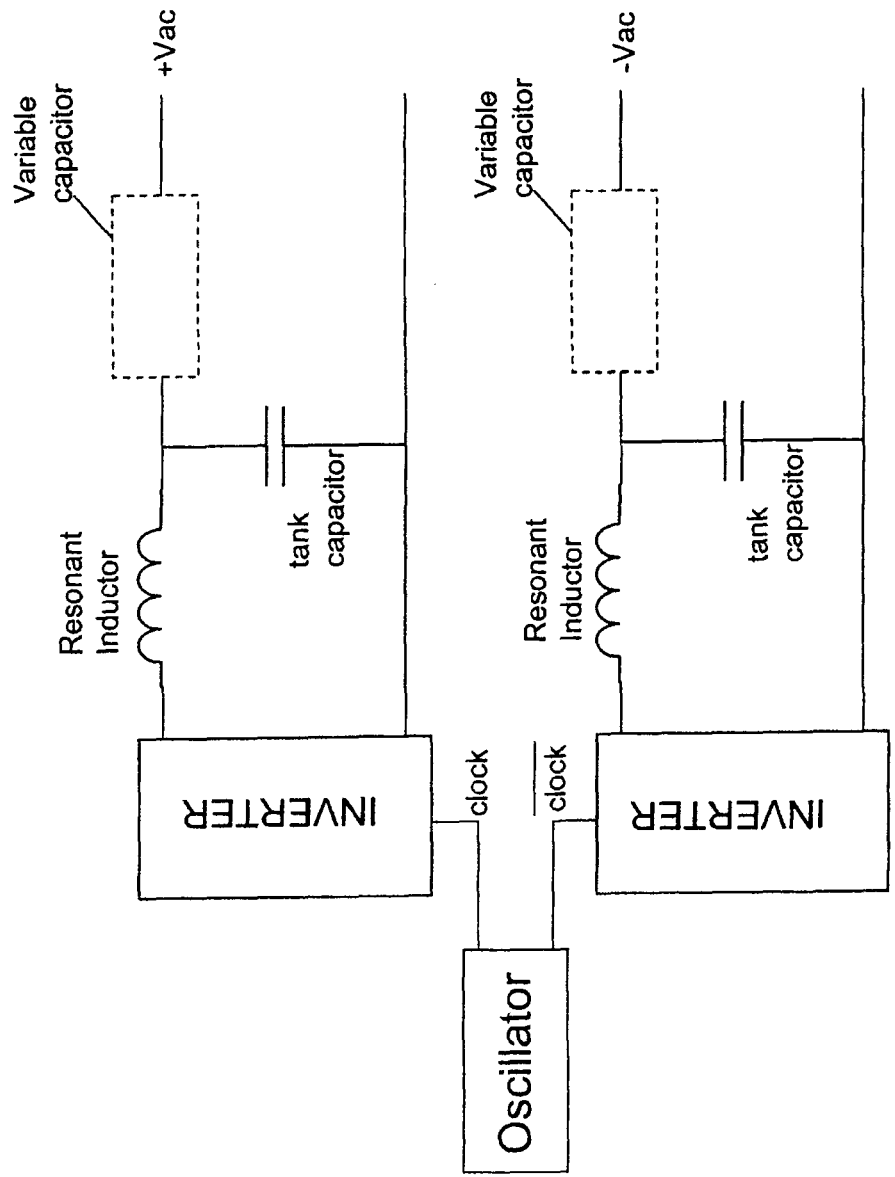
FIG. 24 shows an alternative charger electrical configuration.

FIG. 24 shows an alternative arrangement for providing the two signals of opposite polarity. Instead of using a transformer, there are two separate inverters. These are both fed to a common oscillator, except that one oscillator input is inverted (or 180 degrees out of phase).

Figure 25:
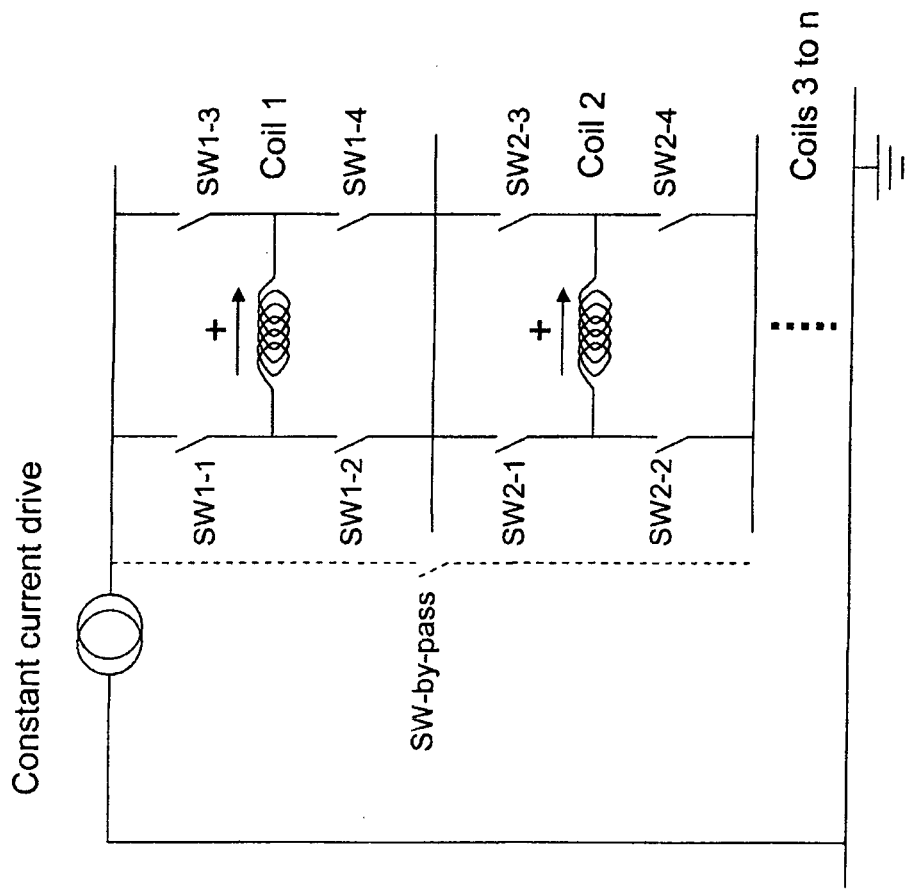
FIG. 25 shows an alternative charger electrical configuration.

FIG. 25 shows a series coil arrangement for driving the coils with constant current. Four switches per coil provide the ability to connect any coil into the chain with any polarity. By way of example, to apply positive current to coil 1 only, switches SW1-1, SW1-4 would be connected and SW1-2 and SW1-3 would be left open. To provide a return path to ground, SW2-1 and SW2-2 would also be connected, and other series coils would be similarly bypassed. To apply negative current to coil 1, SW1-3 and SW1-2 would be connected (and SW1-1 and SW1-4 left open), so that current flows through coil 1 in the opposite direction. Again other coils present must be bypassed. Similarly positive current is applied to coil 2 by connecting SW2-1 and SW2-4 (with SW2-2 and SW2-3 open); negative current is applied to coil 2 by connecting SW2-2 and SW2-3 (with SW2-1 and SW2-4 left open).

If there are a large number of coils, it may be desirable to group them together in zones. Any zone in which there are no coils requiring current could be short-circuited by connecting a 'zone bypass' switch (SW-bypass). The advantage of this arrangement is that the number of closed switches in the current path is reduced. As each switch has a finite 'on-resistance', the total resistance of the path is reduced.

Figure 26:
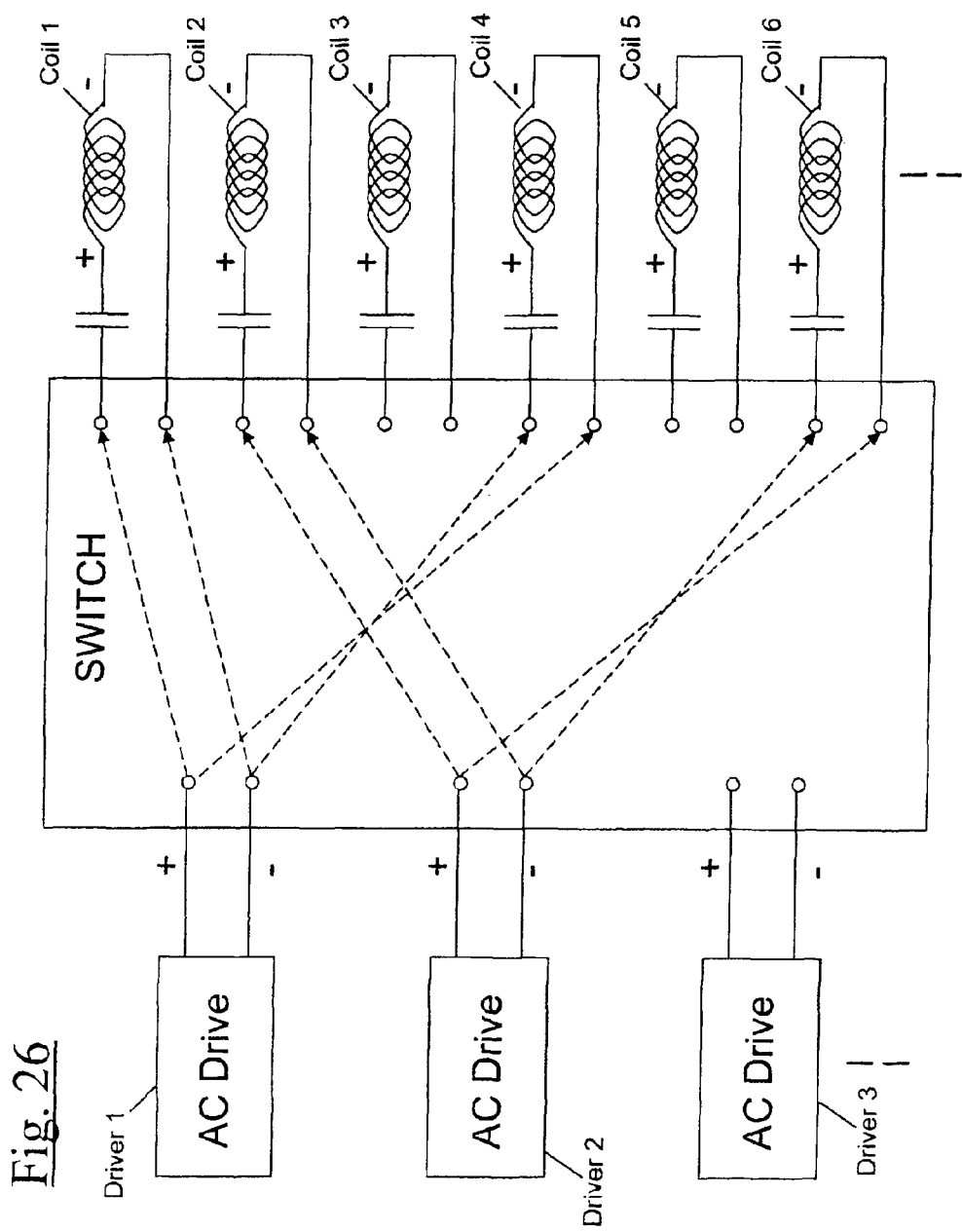
FIG. 26 shows an alternative charger electrical configuration.

FIG. 26 shows a system for driving multiple devices which is particularly good for when the devices have different power requirements. There is a switch matrix which can connect any input to any output. At the inputs (in pairs) there are a number of AC drivers. Each coil is connected to a pair of outputs. A resonant capacitor may be placed at either the driver side or the coil side of the switch. Each driver is used to drive a pair of coils: one coil in the positive polarity and the other in the negative polarity. To drive the positive coil, the positive terminal of the AC driver is connected to the positive terminal of the coil (and likewise the negative source terminal is connected to the negative coil terminal). To drive the negative coil, the positive driver terminal is connected to the negative coil terminal (and likewise the negative driver terminal is connected to the positive coil terminal). There can be a much lower number of drivers than coils. Also it is not necessary to have all drivers connected. In the example illustrated in FIG. 26, driver 1 provides positive current to coil 1 and negative current to coil 4, while driver 2 provides positive current to coil 2 and negative current to coil 6. Each driver can be regulated independently from the others, to match the load seen the device. Further it may be desirable to allow the drivers to selectively connect to more than one pair of coils, depending on how the device is positioned on the charging surface, or the device's load requirements. Instead of using the same driver for both positive and negative current, it is also possible to use 2 separate sources or a dual source (for example as in FIG. 13 or 24). This may reduce the complexity of the switching arrangement.

Figure 27:
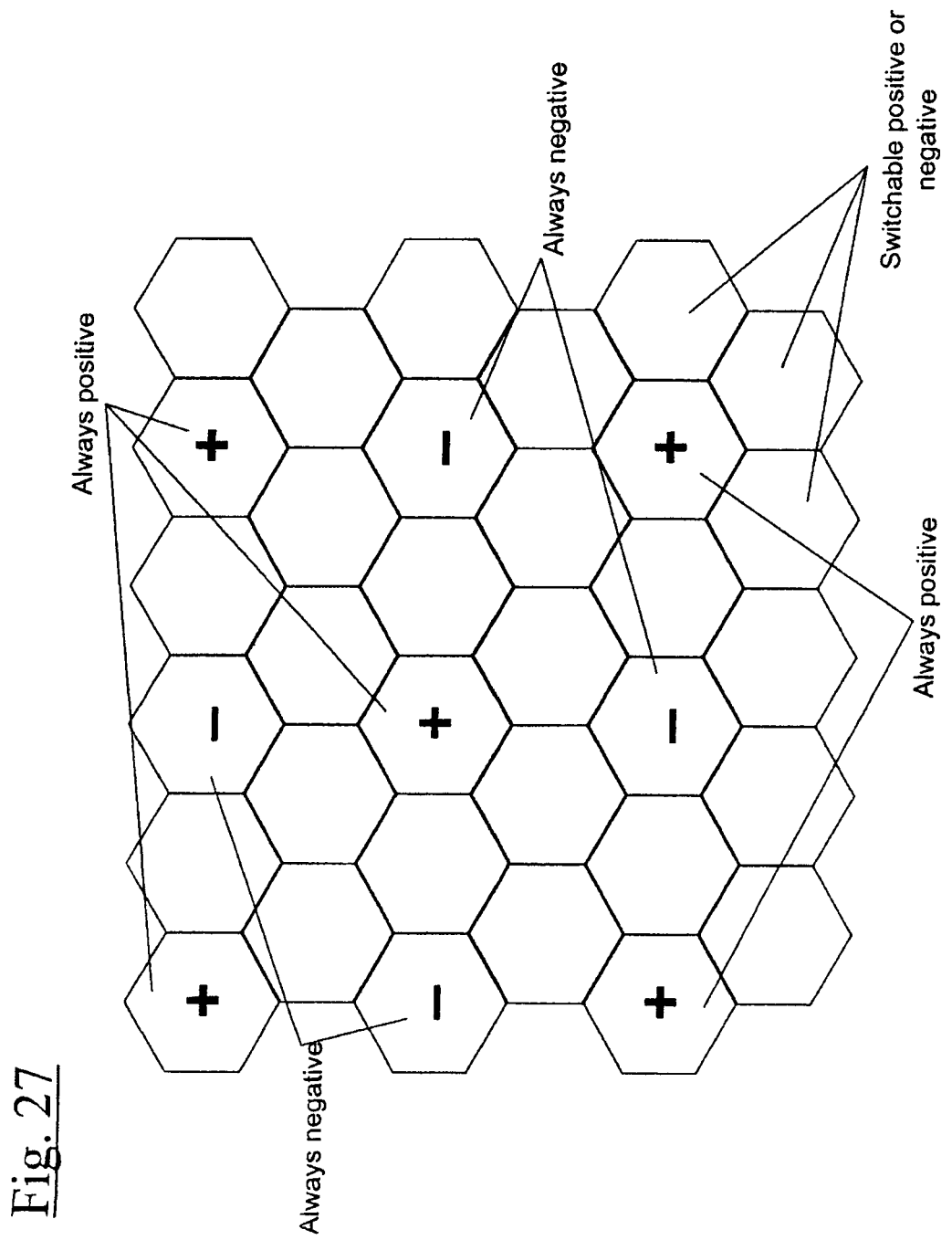
FIG. 27 shows an alternative charger configuration.

FIG. 27 shows an arrangement which may be used to reduce the complexity of the switching system. The device is insensitive as to which end of the receiver is positive and which is negative (the polarity is only a convenient reference notation). It is therefore possible to pre-assign a fixed polarity to some coils. If one of the fixed coils is in proximity to one end of the receiver, then the system must ensure that the other end of the receiver is driven with a coil of opposite polarity. FIG. 27 shows a quarter of the coils having a fixed polarity without any loss in functionality. The coils with fixed polarities are marked with plus and minus signs to indicate the polarity. As some coils are fixed polarity, it means these coils require fewer switches as they are never require the opposite polarity. Alternatively the coils can be assigned a fixed polarity relative to nearby coils. Further, local connections between the coils can be used to reduce switch count.

Switches can be constructed from FETs, IGBTs, triacs, relays, MEMS (micro-electro-mechanical systems) switches or other electronic switches well-known to those skilled in the art.

The above descriptions are those of current embodiments of the invention. Various changes and alterations can be made without departing from the spirit and broader aspects of the invention as defined in the claims, which are to be interpreted in accordance with the principles of patent law including the doctrine of equivalents.

The following statements are considered useful for defining embodiments of the present invention. Features in the above description may be combined with features in the following statements to define further such embodiments.

1. An inductive power transfer system comprising a primary unit and a secondary device separable from the primary unit, the primary unit including a power transfer surface and more than two field generators each operable to generate an electromagnetic field, the field generators being located at different positions relative to the power transfer surface, the secondary device comprising a power receiver having a secondary coil, the system further comprising:
   means for determining at least one of the position and the orientation of the power receiver relative to the power transfer surface; and
   means for controlling the field generators such that at least one first field generator and at least one second field generator, selected in dependence upon such determination, are active in a substantially opposite sense to one another so as to direct magnetic flux through the secondary coil thereby supplying power to the secondary device, and further such that a third one of the field generators is inactive so that fewer than all of the field generators are active simultaneously.

2. A system as defined in statement 1 further comprising:
   a plurality of the secondary devices; and a pair of the first and second field generators for each of the secondary devices.

3. A system as defined in statement 1 wherein:
the secondary coil includes first and second portions; and
the first generator is proximate the first portion, and the second generator is proximate the second portion.

4. A system as defined in statement 3 further comprising a plurality of at least one of the first and second field generators.

5. A system as defined in statement 1 wherein each field generator comprises a coil.

6. A system as defined in statement 1 wherein one of the first and second field generators has a fixed sense.

7. A system as defined in statement 1 wherein the determining means includes means for sensing the inductance of the field generators.

8. A system as defined in statement 1 wherein the switching means includes means for measuring the power consumption of the field generators.

9. A system as defined in statement 1 further comprising a plurality of the third field generators.

10. A system as defined in statement 1 further comprising a plurality of the first field generators and a plurality of the second field generators.

11. A system as defined in statement 1 wherein the secondary coil includes a magnetic core, the system further comprising magnetic material proximate the field generators opposite the magnetic core.

11a. A system as defined in statement 11 wherein the magnetic flux path is primarily magnetic material.

12. A system as defined in statement 1 wherein the field generators are arranged in an array.

13. A system as defined in statement 1 further comprising means for enabling communication between the secondary device and the primary unit.

14. An inductive power transfer system comprising a primary unit and a secondary device separable from the primary unit, the primary unit including a power transfer surface and a plurality of field generators each operable to generate an electromagnetic field, the field generators being located at different positions relative to the power transfer surface, the secondary device including a power receiver having a generally elongated core and a secondary coil wound around the core, the system further comprising:
means for determining at least one of the position and the orientation of the core relative to the power transfer surface; and
means for controlling the field generators such that first and second ones of the field generators, selected in dependence upon such determination, are active in an opposite sense to one another so as to direct magnetic flux through the secondary coil thereby supplying power to the secondary device.

15. A system as defined in statement 14 further comprising a plurality of the secondary devices.

16. A system as defined in statement 14 wherein each field generator comprises a coil.

17. A system as defined in statement 14 wherein one of the first and second field generators has a fixed sense.

18. A system as defined in statement 14 wherein the determining means includes means for sensing the inductance of the field generators.

19. A system as defined in statement 14 wherein the switching means includes means for measuring the power consumption of the field generators.

20. A system as defined in statement 14 wherein the switching means is further for deactivating a third field generator so that fewer than all of the field generators are activated simultaneously.

21. A system as defined in statement 20 further comprising a plurality of the third field generators.

22. A system as defined in statement 14 further comprising a plurality of at least one of the first field generators and the second field generators.

23. A system as defined in statement 14 further comprising magnetic material proximate the field generators opposite the magnetic core.

24. A system as defined in statement 14 wherein the field generators are arranged in an array.

25. A system as defined in statement 14 further comprising means for enabling communication between the secondary device and the primary unit.

26. A system for transferring power from a primary unit to a secondary device, separable from the primary unit, by electromagnetic induction comprising:
the primary unit including a power transfer surface and more than two primary coils;
the secondary device including a power receiver including a secondary coil;
a current generator for generating an alternating current;
determining means for determining the position of the power receiver relative to the power transfer surface; and
switching means responsive to the determining means for supplying current from the current generator to a first primary coil in one sense and to a second primary coil in the opposite sense such that a magnetic flux flows through the secondary coil, supplying power to the secondary device, the switching means further for deactivating a third primary coil so that fewer than all of the coils are activated simultaneously.

27. A system as defined in statement 26 further comprising a plurality of the secondary devices.

28. A system as defined in statement 26 wherein:
the secondary coil includes first and second portions; and
the first generator is proximate the first portion, and the second generator is proximate the second portion.

29. A system as defined in statement 26 wherein one of the first and second primary coils has a fixed sense.

30. A system as defined in statement 26 wherein the determining means includes means for sensing the inductance of the primary coils.

31. A system as defined in statement 26 wherein the switching means includes means for measuring the power consumption of the primary coils.

32. A system as defined in statement 26 further comprising a plurality of the third primary coils.

33. A system as defined in statement 26 further comprising a plurality of at least one of the first primary coils and the second primary coils.

34. A system as defined in statement 26 wherein the secondary coil includes a magnetic core, the system further comprising magnetic material proximate the primary coils opposite the magnetic core.

35. A system as defined in statement 26 wherein the primary coils are arranged in an array.

36. A system as defined in statement 26 further comprising means for enabling communication between the secondary device and the primary unit.

37. A system for transferring power from a primary unit to a secondary device, separable from the primary unit, by electromagnetic induction comprising:

the primary unit including a power transfer surface and more than two primary coils;

the secondary device including a power receiver including a magnetic core and a secondary coil wound around the core;

a current generator for generating an alternating current;

determining means for determining the position of the power receiver relative to the power transfer surface; and switching means for supplying current from the current generator to at least a first primary coil in proximity to a first portion of the magnetic core and to at least a second primary coil in proximity to a second portion of the magnetic core, the direction of the current supplied to the second coil being in the opposite direction to the current supplied to the first primary coil, wherein magnetic flux flows through the secondary coil, supplying power to the secondary device.

38. A system as defined in statement 37 further comprising a plurality of the secondary devices.

39. A system as defined in statement 37 wherein one of the first and second primary coils has a fixed sense.

40. A system as defined in statement 37 wherein the determining means includes means for sensing the inductance of the primary coils.

41. A system as defined in statement 37 wherein the switching means includes means for measuring the power consumption of the primary coils.

42. A system as defined in statement 37 wherein the switching means is further for deactivating a third primary coil so that fewer than all of the primary coils are activated simultaneously.

43. A system as defined in statement 42 further comprising a plurality of the third primary coils.

44. A system as defined in statement 37 further comprising a plurality of at least one of the first primary coils and the second primary coils.

45. A system as defined in statement 37 further comprising magnetic material proximate the primary coils opposite the magnetic core.

46. A system as defined in statement 37 wherein the primary coils are arranged in an array.

47. A system as defined in statement 37 further comprising means for enabling communication between the secondary device and the primary unit.

48. A primary unit for transferring power to a secondary device, separable from the primary unit, by electromagnetic induction, the secondary device including a secondary coil, the primary unit comprising:

a power transfer surface and more than two field generators, each able to generate a field;

determining means for determining the position of the secondary coil relative to the power transfer surface; and switching means responsive to the determining means for activating first and second ones of the field generators such that the field generated by the second field generator is in the opposite sense to the field generated by the first field generator, whereby magnetic flux from the first and second field generators flows through the secondary coil, supplying power to the secondary device, the switching means further for deactivating a third one of the field generators so that fewer than all of the field generators are activated simultaneously.

49. A primary unit as defined in statement 48 wherein:
the secondary coil includes first and second portions; and
the first field generator is proximate the first portion, and the second field generator is proximate the second portion.

50. A primary unit as defined in statement 49 further comprising a plurality of at least one of the first and second field generators.

51. A primary unit as defined in statement 48 wherein each field generator comprises a coil.

52. A primary unit as defined in statement 48 wherein one of the first and second field generators has a fixed sense.

53. A primary unit as defined in statement 48 wherein the determining means includes means for sensing the inductance of the field generators.

54. A primary unit as defined in statement 48 wherein the switching means includes means for measuring the power consumption of the field generators.

55. A primary unit as defined in statement 48 wherein the field generators are arranged in an array.

56. A primary unit as defined in statement 48 further comprising means for enabling communication between the secondary device and the primary unit.

57. A primary unit for transferring power to a secondary device, separable from the primary unit, by electromagnetic induction, the secondary device including a secondary coil having a magnetic core, the primary unit comprising:

a power transfer surface and more than two field generators, each able to generate a field;

determining means for determining the position of the secondary core relative to the power transfer surface; and switching means responsive to the determining means for activating first and second ones of the field generators such that the field generated by the second field generator is in the opposite sense to the field generated by the first field generator, whereby magnetic flux from the first and second field generators flows through the secondary core, supplying power to the secondary device.

58. A primary unit as defined in statement 57 further comprising a plurality of the secondary devices.

59. A primary unit as defined in statement 57 wherein each field generator comprises a coil.

60. A primary unit as defined in statement 57 wherein one of the first and second field generators has a fixed sense.

61. A primary unit as defined in statement 57 wherein the determining means includes means for sensing the inductance of the field generators.

62. A primary unit as defined in statement 57 wherein the switching means includes means for measuring the power consumption of the field generators.

63. A primary unit as defined in statement 57 wherein the switching means is further for deactivating a third field generator so that fewer than all of the field generators are activated simultaneously.

64. A primary unit as defined in statement 63 further comprising a plurality of the third field generators.

65. A primary unit as defined in statement 57 further comprising a plurality of at least one of the first field generators and the second field generators.

66. A primary unit as defined in statement 57 further comprising magnetic material proximate the field generators opposite the magnetic core.

67. A primary unit as defined in statement 57 wherein the field generators are arranged in an array.

68. A primary unit as defined in statement 57 further comprising means for enabling communication between the secondary device and the primary unit.

69. A method for transferring power from a primary unit to a secondary device, separable from the primary unit, by electromagnetic induction, comprising:

providing a power transfer surface;
providing more than two field generators, each able to generate a field;
providing the secondary device including a power receiver;
positioning the secondary device relative to the power transfer surface;
determining the position of the power receiver relative to the power transfer surface; and
activating first and second ones of the field generators such that the field generated by the second field generator is in the opposite sense to the field generated by the first field generator, whereby magnetic flux from the first and second field generators flows through the power receiver supplying power to the secondary device, the activating step further including deactivating a third one of the field generators so that fewer than all of the field generators are activated simultaneously.

70. A method as defined in statement 69 further including providing a plurality of the secondary devices.

71. A method as defined in statement 69 wherein:
the secondary power receiver includes first and second portions; and
the first generator is proximate the first portion, and the second generator is proximate the second portion.

72. A method as defined in statement 69 wherein each field generator comprises a coil.

73. A method as defined in statement 69 wherein one of the first and second field generators has a fixed sense.

74. A method as defined in statement 69 wherein the determining step includes sensing the inductance of the field generators.

75. A method as defined in statement 69 wherein the activating step includes measuring the power consumption of the field generators.

76. A method as defined in statement 69 further comprising a plurality of the third field generators.

77. A method as defined in statement 69 further comprising a plurality of at least one of the first field generators and the second field generators.

78. A method as defined in statement 69 wherein the secondary coil includes a magnetic core, the method further comprising providing magnetic material proximate the field generators opposite the core.

79. A method as defined in statement 69 wherein the field generators are arranged in an array.

80. A method as defined in statement 69 further comprising means for enabling communication between the secondary device and the primary unit.

81. A method for transferring power from a primary unit to a secondary device, separable from the primary unit, by electromagnetic induction, comprising:
providing a power transfer surface;
providing a plurality of field generators, each able to generate a field;
providing the secondary device including a power receiver having a magnetic core and a coil wound about the core;
positioning the secondary device relative to the power transfer surface;
determining the position of the core relative to the power transfer surface; and
activating a first field generator in proximity to a first portion of the core, the switching means activating a second field generator in proximity to a second portion of the core, the field generated by the second field generator being opposite sense to the field generated by the first field generator, whereby magnetic flux from the first and second field generators flows through the secondary core, supplying power to the secondary device.

82. A method as defined in statement 81 further including providing a plurality of the secondary devices.

83. A method as defined in statement 81 wherein:
the secondary power receiver includes first and second portions; and
the first generator is proximate the first portion, and the second generator is proximate the second portion.

84. A method as defined in statement 81 wherein each field generator comprises a coil.

85. A method as defined in statement 81 wherein one of the first and second field generators has a fixed sense.

86. A method as defined in statement 81 wherein the determining step includes sensing the inductance of the field generators.

87. A method as defined in statement 81 wherein the activating step includes measuring the power consumption of the field generators.

88. A method as defined in statement 81 wherein the activating step including deactivating a third field generator so that fewer than all of the field generators are activated simultaneously.

89. A method as defined in statement 88 further comprising a plurality of the third field generators.

90. A method as defined in statement 81 further comprising a plurality of at least one of the first field generators and the second field generators.

91. A method as defined in statement 81 further comprising providing magnetic material proximate the field generators opposite the magnetic core.

92. A method as defined in statement 81 wherein the field generators are arranged in an array.

93. A system as defined in statement 81 further comprising means for enabling communication between the secondary device and the primary unit.

94. An inductive power transfer system comprising a primary unit and a secondary device separable from the primary unit, the primary unit including a power transfer surface and a plurality of field generators each operable to generate an electromagnetic field, the field generators being located in different respective positions relative to the power transfer surface, the secondary device comprising a power receiver having a generally elongated core and a secondary coil wound around the core, the system further comprising:
means for controlling the field generators such that first and second ones of the field generators are active in an opposite sense to one another so as to direct magnetic flux through the secondary coil thereby supplying power to the secondary device.

95. An inductive power transfer system comprising:
a primary unit including a power transfer surface and a plurality of field generators each operable to generate an electromagnetic field, the field generators being located at different positions relative to the power transfer surface;
first and second secondary devices separable from the primary unit, the first secondary device including a power receiver having a coil having an axis that is generally parallel to the power transfer surface when the first secondary device is in an operative position with respect to the power transfer surface, the second secondary device including a power receiver having a coil having an axis that is generally perpendicular to the power transfer surface when the second secondary device is in an operative position with respect to the power transfer surface;

means for determining the presence and the type of at least one secondary device in an operative position with respect to the power transfer surface; and means for at least one of (a) controlling the field generators such that first and second ones of the field generators, selected in dependence upon the determination, are active in an opposite sense to one another when one of the at least one secondary devices is the first secondary device so as to direct magnetic flux through the first secondary device coil thereby supplying power to the first secondary device and (b) controlling the field generators such that a plurality of third coils, selected in dependence upon the determination, are active in the same sense to one another when another of the at least one secondary devices is the second secondary device so as to direct magnetic flux through the second secondary device coil thereby supplying power to the second secondary device.

96. A system as defined in statement 95 wherein the third field generators are activated simultaneously with the first and second field generators.

97. A system as defined in statement 95 wherein the second secondary device coil is a spiral coil.

98. A system as defined in statement 95 wherein the determining means is further for determining at least one of the position and the orientation of the secondary device relative to the power transfer surface.

99. A primary unit for transferring power independently to first and second secondary devices separable from the primary unit, the first secondary device including a power receiver having a coil having an axis that is generally parallel to a power transfer surface when the first secondary device is in an operative position with respect to the power transfer surface, the second secondary device including a power receiver having a coil having an axis that is generally perpendicular to the power transfer surface when the second secondary device is in an operative position with respect to the power transfer surface, the primary unit comprising:

the power transfer surface;

a plurality of field generators each operable to generate an electromagnetic field, the field generators being located at different positions relative to the power transfer surface;

means for determining the presence and the type of at least one secondary device in an operative position with respect to the power transfer surface; and means for at least one of (a) controlling the field generators such that first and second ones of the field generators, selected in dependence upon the determination, are active in an opposite sense to one another when one of the at least one secondary devices is the first secondary device so as to direct magnetic flux through the first secondary device coil thereby supplying power to the first secondary device and (b) controlling the field generators such that a plurality of third coils, selected in dependence upon the determination, are active in the same sense to one another when another of the at least one secondary devices is the second secondary device so as to direct magnetic flux through the second secondary device coil thereby supplying power to the second secondary device.

100. An inductive power transfer system comprising a primary unit and a secondary device separable from the primary unit, the primary unit including a power transfer surface and more than two field generators each operable to generate an electromagnetic field, the field generators being located at different positions relative to the power transfer surface, the secondary device comprising a power receiver having a secondary coil, the system further comprising:

means for determining at least one of the position and the orientation of the power receiver relative to the power transfer surface; and means for controlling the field generators such that at least one first one of the field generators and at least one second one of the field generators, are active in a substantially opposite sense to one another so as to direct magnetic flux through the secondary coil thereby supplying power to the secondary device, the number of the first field generators and the number of the second field generators selected in dependence upon such determination.

In any of the aspects disclosed herein, the various features may be implemented in hardware, or as software modules running on one or more processors. Features of one aspect may be applied to any of the other aspects.

The invention also provides a computer program or a computer program product for carrying out any of the methods described herein, and a computer readable medium having stored thereon a program for carrying out any of the methods described herein. A computer program embodying the invention may be stored on a computer-readable medium, or it could, for example, be in the form of a signal such as a downloadable data signal provided from an Internet website, or it could be in any other form.

The present invention extends to system aspects, and corresponding primary unit aspects, method aspects, and computer-program aspects.

The present application claims priority from UK patent application No. 0716679.6, filed on 28 Aug. 2007, the entire contents of which are incorporated herein by reference.

The embodiments of the invention in which an exclusive property or privilege is claimed are defined as follows, overleaf.

the invention claimed is:

1. A primary unit for use in an inductive power transfer system, the system including said primary unit and a secondary device separable from said primary unit, the system of said primary unit and the secondary device having a resonant frequency and being operable to transfer power inductively to the secondary device, said primary unit comprising:

a power transfer surface capable of enabling inductive coupling with said secondary device in a plurality of different working positions;

a plurality of field generators arranged in an array, each of said field generators operable to generate an electromagnetic field for transferring power inductively to the secondary device, each of said field generators having an axis substantially perpendicular to said power transfer surface and being located at a different position relative to said power transfer surface such that said axes of said field generators are spaced apart with respect to each other; and driver circuitry operable to provide power from a power source to said field generators, said driver circuitry including:

switching circuitry to selectively activate at least one of said plurality of field generators by selectively powering said at least one field generator in order to generate said electromagnetic field, wherein said driver circuitry selectively activates said at least one field generator to transfer power inductively to the secondary device, wherein said driver circuitry is operable to drive one or more of said field generators to provide power to the secondary device in at least one of said plurality of different working positions;

variable impedance circuitry operably coupled between said power source and said plurality of field generators such that said variable impedance circuitry is shared by said plurality of field generators, said variable impedance circuitry to be adjusted to affect the resonant frequency of the system based on which of said plurality of field generators are selectively activated by said switching circuitry to generate said electromagnetic field, wherein said variable impedance circuitry is adjusted in operation to a predetermined impedance based on which of said plurality of field generators are selectively activated; and wherein said variable impedance circuitry includes a plurality of capacitors arranged in a switched network shared by the plurality of field generators, wherein one or more switches of said switched network are selectively controlled to select an impedance of said variable impedance circuitry.

2. The primary unit of claim 1 further comprising control circuitry to control said switching circuitry to selectively activate said at least one field generator to transfer power inductively to the secondary device.

3. The primary unit of claim 2 wherein said control circuitry maintains inductive power transfer at or near the resonant frequency by adjusting said variable impedance circuitry.

4. The primary unit of claim 2 wherein said control circuitry adjusts said variable impedance circuitry based on a number of selectively activated field generators.

5. The primary unit of claim 4 wherein said control circuitry adjusts said variable impedance circuitry based on a load of the secondary device.

6. The primary unit of claim 4 further comprising determining circuitry to determine a position and an orientation of the secondary device relative to said power transfer surface, wherein said control circuitry adjusts said variable impedance circuitry based on said determined position of the secondary device and said determined orientation.

7. The primary unit of claim 2 wherein the secondary device includes a secondary coil operable to inductively couple with said field generators; wherein said control circuitry selectively activates said at least one field generator such that at least one first field generator and at least one second field generator are active in a substantially opposite polarity to one another so as to direct magnetic flux through the secondary coil thereby supplying power to the secondary device, and further such that a third one of said field generators is inactive so that fewer than all of said field generators are active simultaneously.

8. The primary unit of claim 1 wherein the system includes a plurality of secondary devices, and said field generators are operable to be selectively activated to provide power inductively to the plurality of secondary devices.

9. The primary unit of claim 1 wherein said switched network includes parallel circuits comprising said plurality of capacitors in series with said one or more switches.

10. An inductive power transfer system for transferring power to at least one secondary device comprising:

a primary unit including a power transfer surface and a plurality of field generators arranged in an array, each of said field generators operable to generate an electromagnetic field for inductive power transfer, said primary unit including switching circuitry to selectively activate at least one of said plurality of field generators by selectively providing power from a power source to said at least one field generator, each of said field generators having an axis substantially perpendicular to said power transfer surface and being located at a different position relative to said power transfer surface such that said axes of said field generators are spaced apart with respect to each other, wherein said field generators are positioned to provide power to said at least one secondary device at any location in proximity to said power transfer surface;

said at least one secondary device separable from said primary unit, said at least one secondary device including a power receiver operable to inductively couple with said field generators for inductive power transfer; wherein said system of said primary unit and said at least one secondary device has a resonant frequency;

variable impedance circuitry operably coupled between said power source and said plurality of field generators such that said variable impedance circuitry is shared by said plurality of field generators, said variable impedance circuitry to be adjusted to affect said resonant frequency of said inductive power transfer system based on which of said plurality of field generators are selectively activated by said switching circuitry to generate said electromagnetic field, wherein said variable impedance circuitry is adjusted in operation to a predetermined impedance based on which of said plurality of field generators are selectively; and wherein said variable impedance circuitry includes a plurality of capacitors arranged in a switched network shared by the plurality of field generators, wherein one or more switches of said switch network are selectively controlled to select an impedance of said variable impedance circuitry.

11. The inductive power transfer system of claim 10 further comprising control circuitry to control said switching circuitry to selectively activate said at least one field generator in order to transfer power inductively to said at least one secondary device.

12. The inductive power transfer system of claim 10 further comprising control circuitry to maintain inductive power transfer at or near said resonant frequency by adjusting said variable impedance circuitry.

13. The inductive power transfer system of claim 12 wherein said control circuitry adjusts said variable impedance circuitry based on a number of selectively activated field generators.

14. The inductive power transfer system of claim 12 wherein said control circuitry adjusts said variable impedance circuitry based on a load of said at least one secondary device.

15. The inductive power transfer system of claim 12 wherein said primary unit includes determining circuitry to determine a position of said at least one secondary device relative to said power transfer surface, wherein said control circuitry adjusts said variable impedance circuitry based on said determined position of said at least one secondary device.

16. The inductive power transfer system of claim 10 wherein said primary unit includes said variable impedance circuitry.

17. The inductive power transfer system of claim 10 wherein said switched network includes parallel circuits comprising said plurality of capacitors in series with said one or more switches.

18. A method for use in an inductive power transfer system, the system comprising a primary unit and a secondary device separable from the primary unit, the primary unit including a power transfer surface, drive circuitry, and a plurality of field generators arranged in an array and each being operable to generate an electromagnetic field to transfer power in proximity to the power transfer surface, said method comprising:

selectively activating a number of the field generators to transfer power inductively to the secondary device to provide power to the secondary device at any location in proximity to the power transfer surface, wherein each of the field generators has an axis substantially perpendicular to the power transfer surface and is located at a different position relative to said power transfer surface such that the axes of the field generators are spaced apart with respect to each other;

controlling the drive circuitry to supply power to the number of active field generators in order to form an inductive coupling between the active field generators and the secondary device, wherein the inductive coupling has a resonant frequency;

adjusting an impedance of the drive circuitry to maintain inductive power transfer at or near the resonant frequency based on which of said field generators are selectively activated to transfer power, wherein the impedance circuitry is adjusted in operation to a predetermined impedance based on which of the plurality of field generators are selectively activated;

wherein the variable impedance circuitry is operably coupled between a power source and the plurality of field generators such that the variable impedance circuitry is shared by the plurality of field generators, wherein the variable impedance circuitry includes a plurality of capacitors arranged in a switched network shared by the plurality of field generators; and selectively controlling one or more switches of the switch network to select an impedance of said variable impedance circuitry.

19. The method of claim 18 wherein the switched network includes parallel circuits comprising the plural of capacitors in series with the one or more switches.

20. The method of claim 18 wherein the impedance of the drive circuitry is adjusted based on the number of active field generators.

21. A primary unit for use in an inductive power transfer system, the system including said primary unit and a secondary device separable from said primary unit, the system of said primary unit and the secondary device having a resonant frequency and being operable to transfer power inductively to the secondary device, said primary unit comprising:

a power transfer surface capable of enabling inductive coupling with said secondary device in a plurality of different working positions;

a plurality of field generators arranged in an array and disposed adjacent said power transfer surface, each of said field generators operable to generate an electromagnetic field for transferring power inductively to the secondary device, each of said field generators having an axis substantially perpendicular to said power transfer surface and being located at a different position relative to said power transfer surface such that said axes of said field generators are spaced apart with respect to each other;

determining circuitry to determine a position and orientation of the secondary device relative to said power transfer surface;

driver circuitry operable to provide power from a power source to said field generators as a function of said determined position and said determined orientation, said driver circuitry including:

switching circuitry to selectively activate at least one of said plurality of field generators by selectively powering said at least one field generator in order to generate said electromagnetic field to provide power to the secondary device in at least one of said plurality of different working positions;

variable impedance circuitry operably coupled between said power source and said plurality of field generators such that said variable impedance circuitry is shared by said plurality of field generators, said variable impedance circuitry to be adjusted to affect the resonant frequency of the system, wherein said variable impedance circuitry is adjusted in operation to a predetermined impedance based on which of said plurality of field generators are selectively powered; and wherein said variable impedance circuitry includes a plurality of capacitors arranged in a switched network shared by the plurality of field generators, wherein one or more switches of said switched network are selectively controlled to select an impedance of said variable impedance circuitry.

22. The primary unit of claim 21 further comprising control circuitry to control said switching circuitry to selectively activate said at least one field generator to transfer power inductively to the secondary device.

23. The primary unit of claim 22 wherein said control circuitry maintains inductive power transfer at or near the resonant frequency by adjusting said variable impedance circuitry.

24. The primary unit of claim 22 wherein said control circuitry adjusts said variable impedance circuitry based on a number of selectively activated field generators.

25. The primary unit of claim 24 wherein said control circuitry adjusts said variable impedance circuitry based on a load of the secondary device.

26. The primary unit of claim 24 wherein each of said plurality of field generators are located in a plane substantially parallel to said power transfer surface and located at different positions within said plane substantially parallel to said power transfer surface.

27. The primary unit of claim 22 wherein the secondary device includes a secondary coil operable to inductively couple with said field generators; wherein said control circuitry selectively activates said at least one field generator such that at least one first field generator and at least one second field generator are active in a substantially opposite sense to one another so as to direct magnetic flux through the secondary coil thereby supplying power to the secondary device, and further such that a third one of said field generators is inactive so that fewer than all of said field generators are active simultaneously.

28. The primary unit of claim 21 wherein the system includes a plurality of secondary devices, and said field generators are operable to be selectively activated to provide power inductively to the plurality of secondary devices.

29. The primary unit of claim 21 wherein said switched network includes parallel circuits comprising said plurality of capacitors in series with said one or more switches.

* * * * *

UNITED STATES PATENT AND TRADEMARK OFFICE
CERTIFICATE OF CORRECTION

| | | |
|---|---|---|
| PATENT NO. | : 8,587,154 B2 | Page 1 of 1 |
| APPLICATION NO. | : 12/672691 | |
| DATED | : November 19, 2013 | |
| INVENTOR(S) | : Fells et al. | |

It is certified that error appears in the above-identified patent and that said Letters Patent is hereby corrected as shown below:

In the Claims

Column 24, claim 10, line 25:

"generators are selectively; and"

should be

--generators are selectively activated; and--

Signed and Sealed this
Fourth Day of February, 2014

Michelle K. Lee
*Deputy Director of the United States Patent and Trademark Office*